United States Patent
von Mueller et al.

(10) Patent No.: US 7,568,621 B2
(45) Date of Patent: *Aug. 4, 2009

(54) TRANSPARENTLY SECURING TRANSACTIONAL DATA

(75) Inventors: Clay von Mueller, San Diego, CA (US); Robert J. Mos, San Diego, CA (US); Bob Mos, Mammoth Lakes, CA (US)

(73) Assignee: Semtek Innovative Solutions Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/958,268

(22) Filed: Dec. 17, 2007

(65) Prior Publication Data

US 2008/0149718 A1   Jun. 26, 2008

Related U.S. Application Data

(63) Continuation of application No. 11/127,862, filed on May 12, 2005, now Pat. No. 7,506,812, which is a continuation-in-part of application No. 10/936,359, filed on Sep. 7, 2004, now Pat. No. 7,309,012.

(51) Int. Cl.
*G06K 7/08* (2006.01)

(52) U.S. Cl. ............... 235/449; 235/380; 235/439; 235/493

(58) Field of Classification Search ............... 235/449, 235/380, 493, 487, 375, 382.5, 383
See application file for complete search history.

(56) References Cited

U.S. PATENT DOCUMENTS

2003/0192948 A1 * 10/2003 Izuyama .................. 235/449

* cited by examiner

*Primary Examiner*—Edwyn Labaze
(74) *Attorney, Agent, or Firm*—Sheppard Mullin Richter & Hampton LLP

(57) ABSTRACT

A secure magnetic stripe card stripe reader (MSR) module and software system capable of encrypting the magnetic stripe data to CPI, SDP and CISP standards for use in point of sale (POS) and other applications requiring data security using non secure networks and computing devices. Additionally, when incorporated within an attachment for conventional personal digital assistant (PDA) or cell phone or stationary terminal, provides encrypted data from the magnetic head assembly providing compliance with Federal Information Processing Standards Publication Series FIPS 140 covering security and tampering standards. Moreover, this module and software system includes the capability of providing secure POS transactions to legacy transaction processing systems and POS terminals transparently to the existing infrastructure. Furthermore, this module and software system includes the capability of transparently providing detection of fraudulently copied magnetic stripe cards.

15 Claims, 24 Drawing Sheets

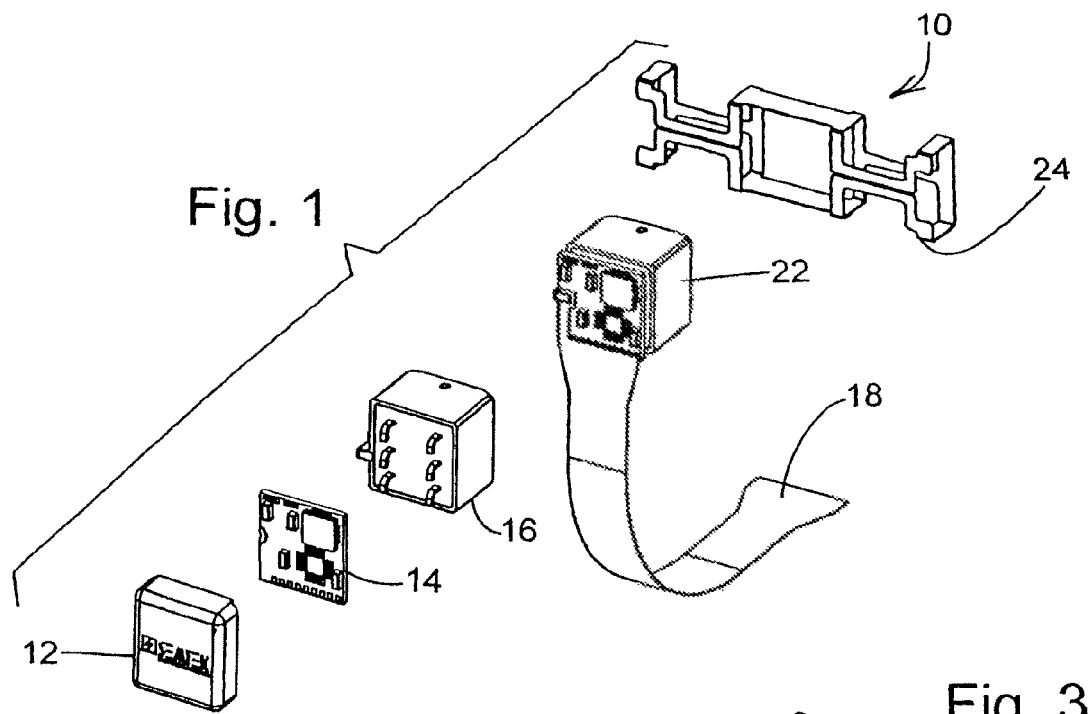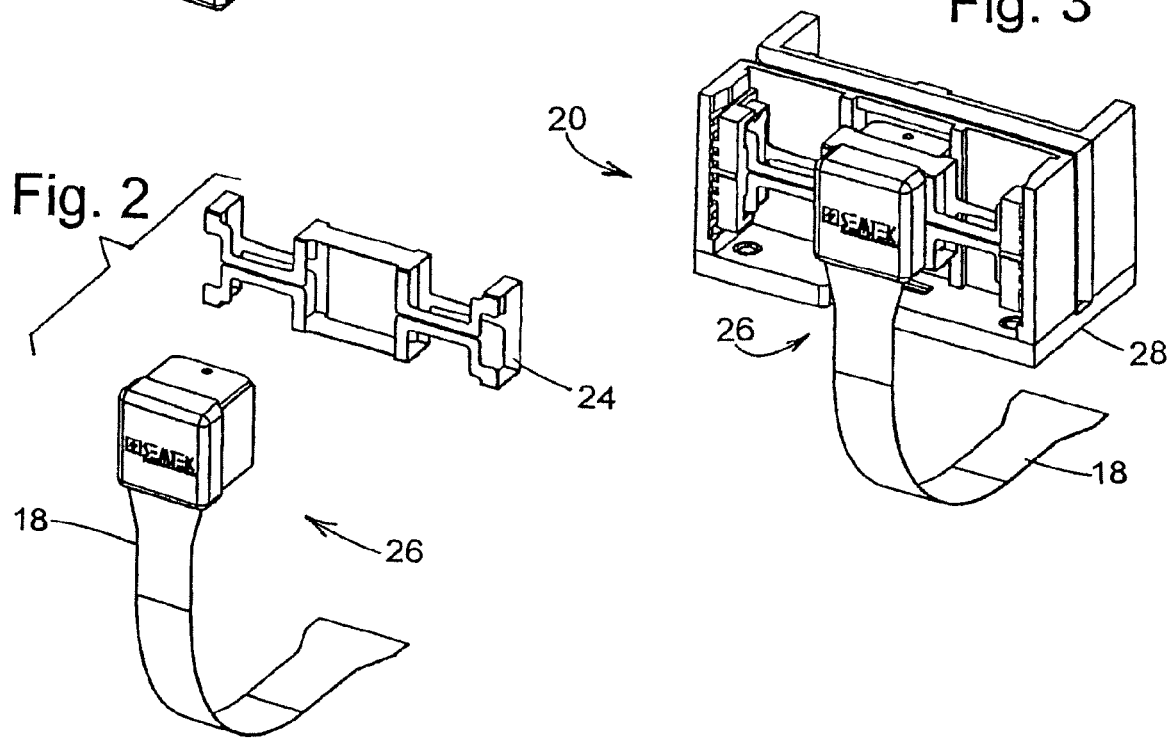

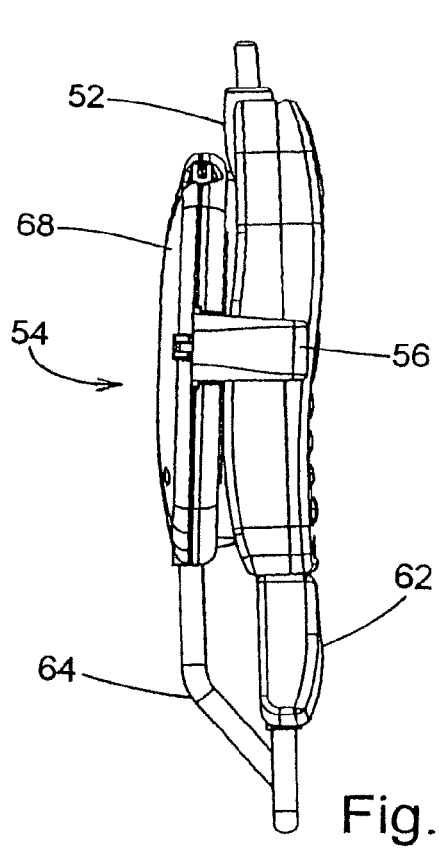
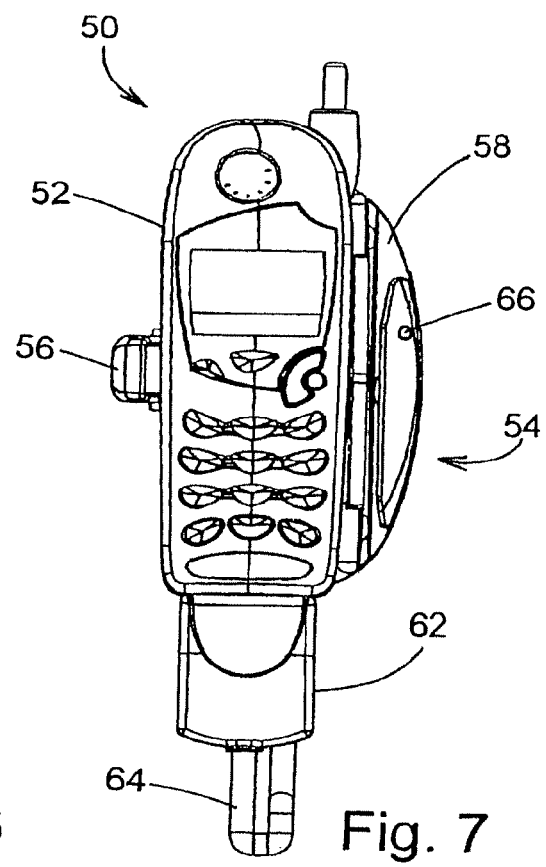
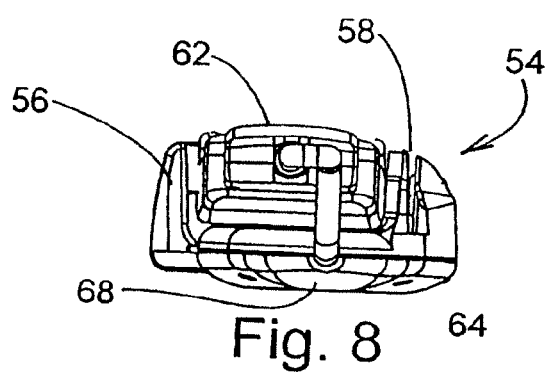
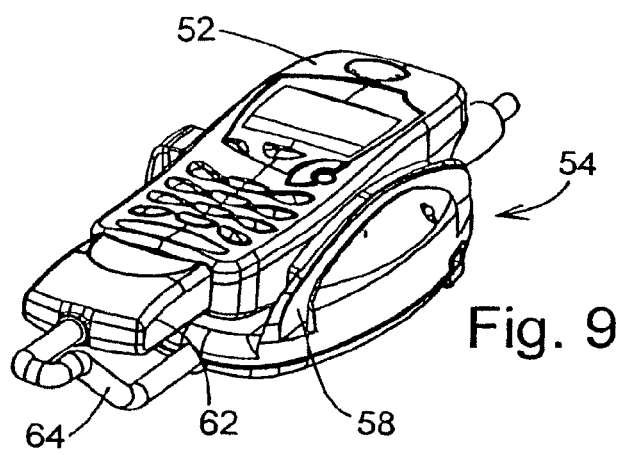
Fig. 6
Fig. 7
Fig. 8
Fig. 9

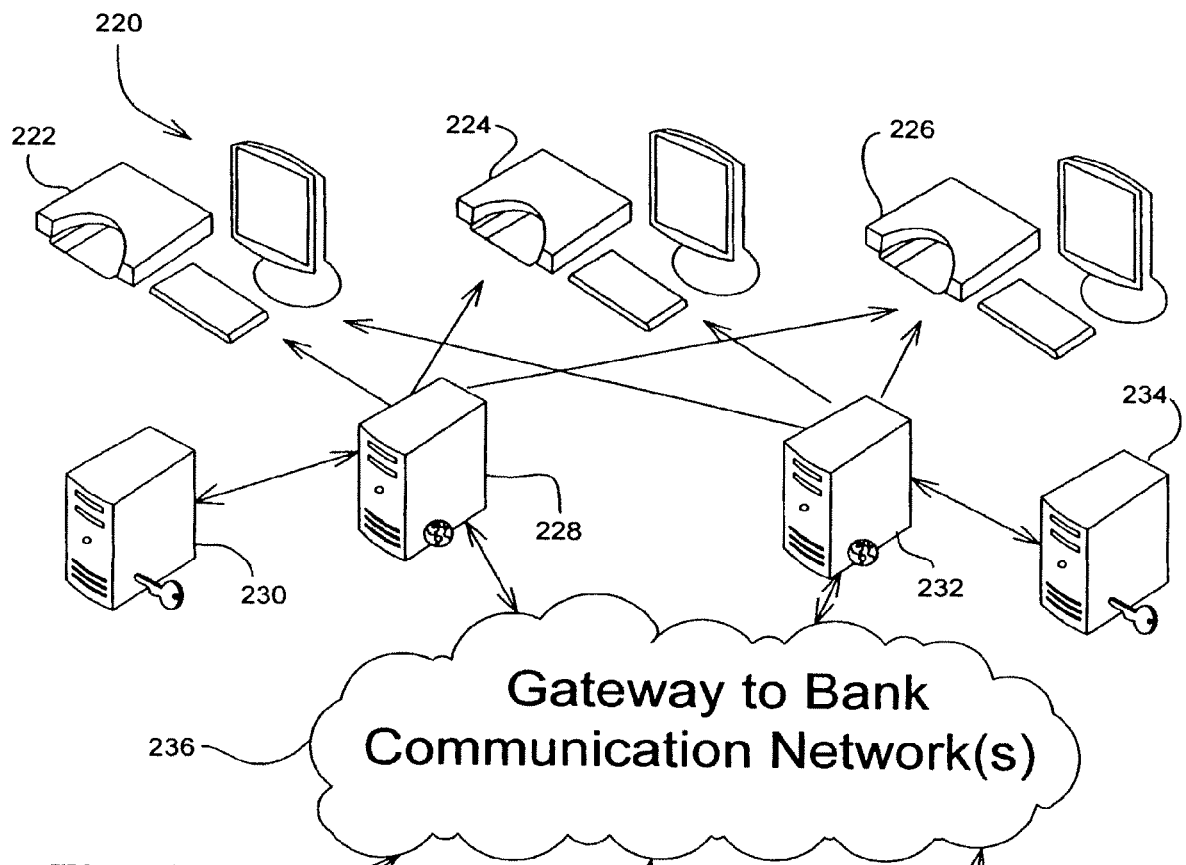
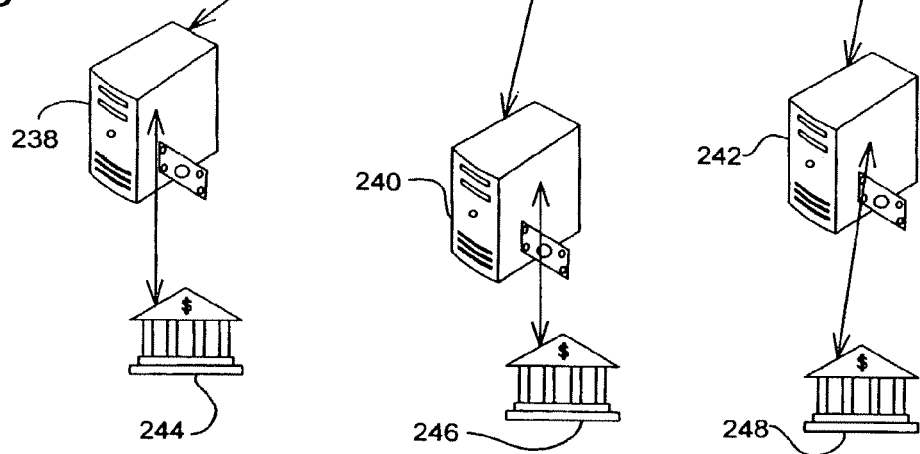
Fig. 24

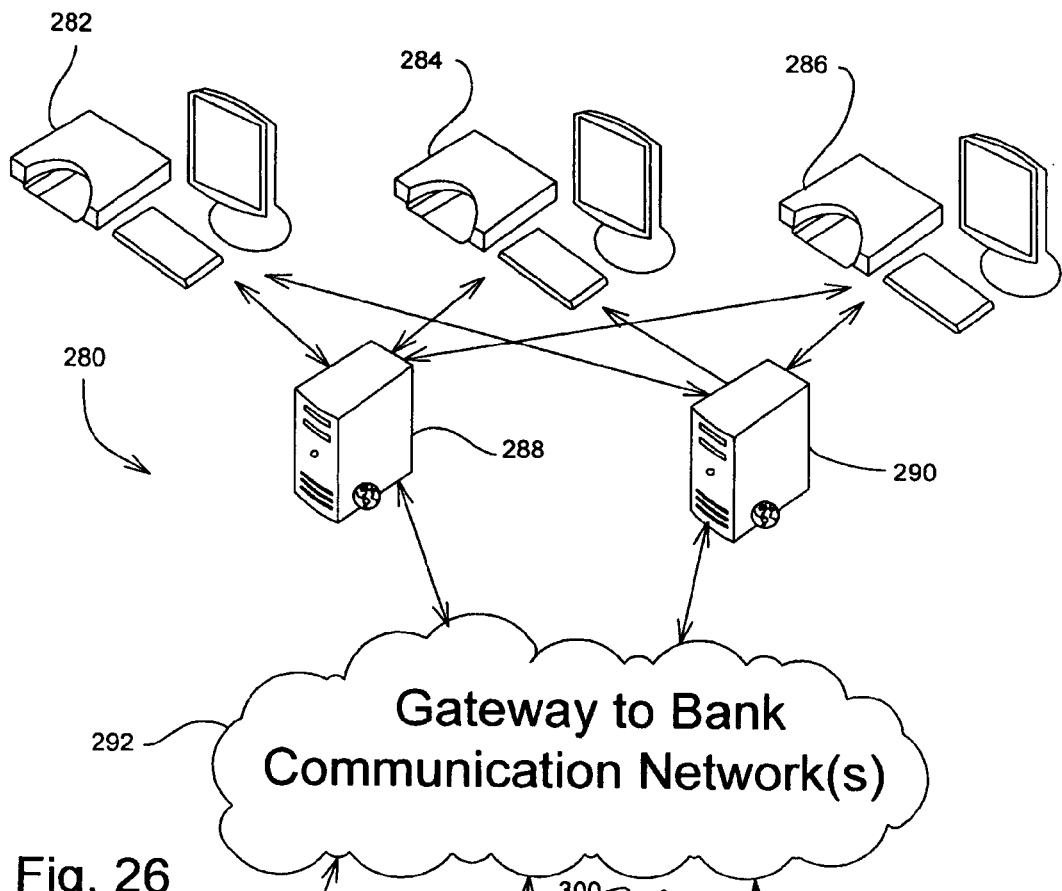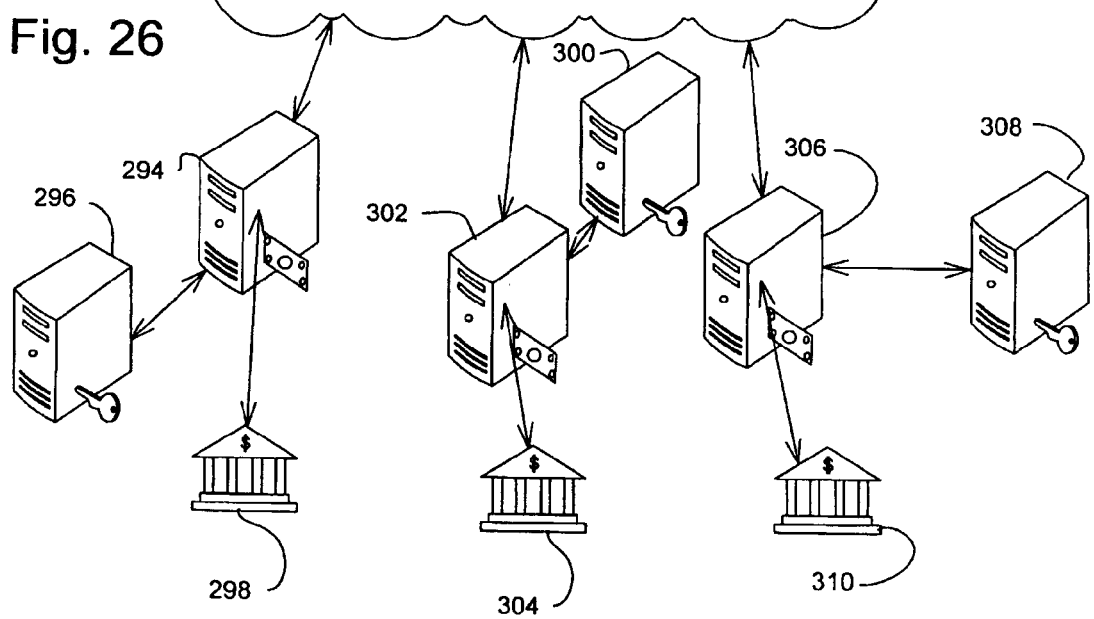
Fig. 26

TRANSPARENTLY SECURING TRANSACTIONAL DATA

This application is a continuation of U.S. patent application Ser. No. 11/127,862, filed on May 12, 2005 now U.S. Pat. No. 7,506,812, which is a continuation-in-part of U.S. patent application Ser. No. 10/936,359, filed on Sep. 7, 2004 now U.S. Pat. No. 7,309,012, each of which is herein incorporated in its entirety.

BACKGROUND OF THE INVENTION

1. Field of the Invention

The present invention relates to a method for protecting magnetic stripe data in transit from the magnetic stripe reader to a host computer while maintaining compatibility with the data format contained within the magnetic stripe data. The present invention further relates to a magnetic stripe reader assembly which replaces the magnetic head in conventional point of sale terminals (POS) which encrypts the magnetic stripe information within the magnetic head preventing unauthorized access to said information. More particularly, the present invention relates to a secure magnetic stripe reader attachable to a POS or handheld computing device which enables the secure reading and writing of information on a single or multiple track magnetic stripe by encrypting the card data prior to entering the POS or PDA in a format transparent to the devices normal operation.

2. Description of the Related Art

Cards which have a magnetic stripe attached thereto are ubiquitous in modern society today. That is, nearly everyone carries one of the following cards, each of which typically have a magnetic stripe attached thereto: credit cards, bank cards, automatic teller machines cards (ATM cards), debit cards, identification cards, drivers' licenses, security access cards, check cashing cards, etc.

The necessity and usefulness of devices which decode the information on such cards are well known. The need to read and decode and save the information on such cards using low cost and portable computing devices including PDA's and cell phones has become increasingly evident in recent months. One such application is in reading the custom formats used in US state driver's licenses. To date, forged drivers licenses used to purchase alcohol and tobacco do not contain correctly encoded data on the attached magnetic stripe. The described invention can be used to read the various formats in use by various US state's department of motor vehicles and display the physical description recorded on the magnetic stripe. Liquor stores, bars, and law enforcement agencies can use this portable system to determine the authenticity of the identification cards being used to purchase controlled substances. One benefit of the current invention over previous art is the increased security of the device and the information transferred. In the age verification application, only the information necessary for the user identification is output from the head in a readable format. Other data such as the driver's license number is output in an encrypted format and stored for later verification of the identifications acceptance if required by law enforcement agencies.

Another application in using MSR card reader attachments with handheld computing devices such as PDA's and cell phones, is to process credit card and debit card transactions. In these applications, the wireless and movable nature of the POS transaction makes security a requirement. If clear text of the card data is allowed to enter the handheld, a virus or "Trojan horse" program could capture the data to compromise the card holder's monetary accounts. Card skimming, which is the illegal recording and use of credit/debit card information to make fraudulent purchases, currently represents approximately 25% of credit/debit card company losses. This number is expected to increase to over a billion dollars in the future. In spite or long standing regulations that no track data be stored by POS terminals, transaction processing gateways, or merchants in clear text formats it is common knowledge that this data is stored and has been compromised. Millions of credit and debit cards magnetic stripe data has been stolen from these sources and used to transact fraudulent transactions. The major credit and debit card brands have enacted new regulations in an attempt to curb availability of the magnetic stripe data. Unfortunately compliance to these new regulations could require replacing all POS terminals deployed. With millions of POS terminal in use the cost to the merchants for upgrading POS equipment to comply with the new regulations is prohibitive.

In addition to providing a low power, secure intelligent magnetic stripe reader for handheld computing application this invention can be used in legacy products to provide the additional security required in today's POS markets. The modules intelligent interface can be configured to various digital interfaces such as SPI, I2C, or serial TTL which are supported by the legacy equipment currently in use. In addition, the module can mimic the output of a conventional head providing encrypted data to the legacy equipment. In addition the module can output using new protocols such as Bluetooth.

Current wired and wireless transaction processing servers rely on whatever the networks "end to end" security is for protecting credit and debit card transactions. In many applications, the network is secure from the transaction terminal to the processing banks server. In some applications, most noticeably the use of cell phone and other handheld computing devices as the POS transaction terminal, the security provided by the network is less than ideal. WAP based transaction processing is subject to the security implementation provided by the wireless carrier. In the case of one such wireless provider, Nextel®, the encryption and hence the security of the data varies from clear text to 56 bit DES to 128 bit TDES. While the TDES meets the card industry standards for security, the others do not, which makes it impossible to guarantee end to end strong encryption of at least the TDES level. The present invention supports strong end to end encryption along with the ability to interface to banks legacy transaction processing systems and to in addition verify the cards authenticity.

SUMMARY OF THE INVENTION

Therefore, the principal advantage of the present invention is to provide a new and improved secure magnetic stripe reader, which interfaces to legacy POS terminals and transaction processing networks, to low cost PDA's such as manufactured by Palm, Hewlett Packard, and Symbol, to cell phones such as the Motorola iDen i95, and for use by outside equipment manufacturers (OEM's) in new designs. Many of these functions are small, portable devices which have a limited useful battery life. To ensure that devices connected to these PDA's do not drain the batteries too quickly, all of the connections to external devices are electrical current limited. The power required from external devices is 2.5V at 100 uA. Current serial port magnetic stripe readers (MSR's) require 5V at 10 MA to operate correctly. The present invention uses several novel power management design features to lower the power required to less than 50 uA at 2.5V.

With one implementation of the current invention selected card track data is encrypted during the reading of the magnetic stripe with a format as described in hidden des standard data format drawing. The combination of clear text track data and the encrypted track data which is output from the reader has the same track data format as read from the card which allows legacy POS equipment to function without modification. After the encrypted data is sent to the processing bank via various secure and insecure networks the required keys are used to decrypt and reconstruct the original magnetic stripe data and format of the card data for processing. The output being encrypted as required by the major brands provides for adherence to the new regulations without replacing the POS equipment.

In another implementation of the current invention selected card track data is encrypted during the manufacturing of the card with a format as described in hidden des standard data format drawing. The data written to the card is used to generate a one way hash code. This hash code and the encryption key used to encode the data are stored in a secure database for future use in decrypting the card data. As with other embodiments of this invention the encrypted card data format is compatible with legacy or the current non encrypted data format currently in use. The clear text information remaining in the stripe data is sufficient for legacy POS equipment to perform is current tasks without changing the current applications or infrastructure. After the encrypted data is sent to the processing bank via various secure and insecure networks the required keys are used to decrypt and reconstruct the original magnetic stripe data and format of the card data for processing. It should be noted that this application and the former where that card data is encrypted in the MSR are cross compatible and there would be benefit in using both techniques together. Encrypting the data in the reader attaches reader and POS information to the card while encrypting during manufacturing prevents standard card readers from reading and storing the data for illicit uses.

Another advantage of the present invention to provide additional power savings and ease of operation by controlling the PDA and/or cell phone. The battery life of the PDA and/or cell phone is severely limited if the unit is powered on or if the serial port is enabled. The current invention monitors the MSR in a very low current mode, at less than 100 uA until a card is swiped. The PDA and/or cell phone is then turned on, but just long enough to record and display the data before being automatically turned off again. In this way electrical output power is conserved and no additional power switch is required.

It is yet another advantage of the present invention to provide the MSR with a reconfigurable processor/memory module to facilitate user upgrades and data logging capabilities. Most PDA's and/or cell phones lose their program and data information if the batteries are drained or removed. The removable processor/memory module incorporated into the MSR module allows for programs and data used and stored by the MSR to be retained in the event that the PDA and/or cell phone batteries are drained or removed. Updates to programs used by the PDA and/or cell phone along with new data formats can be installed in the field with no technical experience. In addition, data read from the cards can be stored for later retrieval by the PDA and/or cell phone, or removed from the sled and read by a conventional personal computer (PC). In all of the above applications, the correct encryption keys are required to alter or access any information inside the module.

It is yet a further advantage of this invention to provide strong encryption for card transactions in environments which currently do not support the required level of security. One such application is in using a cell phone as the communication transport for a card transaction. Most current cell phones provide for WAP applications to be displayed on the phone. These applications run in a micro-browser which is similar to the large browsers such as Internet Explorer® or Netscape® The phone is able to browse to a web site the supports the micro-browser used on the phone. The MSR module's interface is programmed to emulate the external keyboard supplied as a option by the manufacturer.

To make a credit or debit card transaction, the user who is registered to make such transactions goes to a transaction enabled web site using the phones browser. Once at the web site the sales transaction information is entered using the phone's keypad after which the MSR module which is attached to the phone as the external keyboard would be, is used to read the magnetic stripe data, encrypt the data, and then send it to the website for decryption and processing. In current browser based card transaction processing systems, the card data is sent to the phone as clear text which is susceptible to skimming. In addition the security provided by cell phone carriers is variable and may allow access to the clear text card data being transmitted.

Due to previous compromises of card data VISA® has initiated its Cardholder Information Security Program (CISP) and Master Card® has initiated Site Data Protection (SDP) for all transmission and storage of sensitive card data. In addition an industry wide security requirements standard the Card Payment Industry Data Security Standard (CPI) has been adopted which requires compliance and external audit verification of the required security practices.

One of the requirements is that strong encryption be used in all links of the card data communication chain. Due to the variable nature of the wireless networks it is difficult to ascertain the level of encryption throughout the network and the various gateways and mediums used. From the phone to the cell tower may be adequately secure while the next link may be over POTS (telephone), lease lines, or microwave links may not support the level of security required by CISP and SDP. To certify compliance to VISA® and Master Card® requires all communication links and computer applications to be certified where sensitive data is present in clear text. In addition, it must be shown that no computing device in which the card data in clear text can be compromised to capture the text. This includes the cell phone or PDA and the attached MSR which are inherently insecure devices. This also includes all legacy POS equipment and all legacy gateways which pass the information to the processing banks.

In the present invention, the novel magnetic stripe module moves the data encryption to the magnetic head module which by most normal manufacturing methods is encased in epoxy and steel. A conventional MSR attachment could be compromised and a recording device put inside to capture card information without interfering with the devices operation. In the presently described secure head module, the magnetic head which is mounted in a precision assembly to provide very accurate contact to the magnetic stripe would need to be removed from the MSR, the epoxy removed from the magnetic head, the encryption engine reverse engineered, the keys removed without loss, a read mechanism added to the unit, the whole unit reassembled and calibrated to skim card data. The effort required is equivalent to that required to compromise a smart card.

Therefore, it is yet a further advantage of this invention to provide a mechanism to change the encryption keys of the encryption engine in WAP applications which only support data transmission from the secure head module, and cannot receive input commands, through the use of cards encoded with formats distinguishable from standard credit card and drivers license formats. In the case of the new key request command, the card is swiped while the head module is connected to the handheld computing device which is browsing the WAP site supporting this application. The card is swiped, the MSR module generates a new key, encrypts that key with the command or current key, and sends the packet with the unit's serial number and other status information to the web application. The application sends notification back to the handheld computing device of the completion of the command request or requests the card be re-swiped to re-run the command request.

It is yet a further advantage of this invention to provide a mechanism to change the encryption keys of the encryption engine in applications which only support data transmission from the secure head module, and cannot receive input commands, through the use of cards encoded with formats distinguishable from standard credit card and drivers license formats. In the case of the new key request command, a card containing an encrypted command is swiped while the head module or MSR is connected to the POS or handheld computing device which is running the supporting application. The card is swiped; the MSR module generates a new key, encrypts that key with the command or current key, and sends the packet formatted in the applications conventional format with certain clear text information that indicates that the command has been processed. The application sends the data to the processing gateway as it would a normal transaction. The gateway decodes the command request, decrypts and saves the new MSR keys and notifies the POS or PDA application of a successful command operation or requests the card be re-swiped to re-run the command request.

In addition, the card reader can use a special card number to periodically at random intervals request to change the encryption keys. In this case, the reader stores the current card swipe and sends the request for setting new keys along with the new keys encrypted using the old keys to encrypt the new keys and the new keys to encrypt the new card information. If the same card is swiped again within a short time interval, the reader repeats the same operation under the assumption that there was a transmission error.

It is yet a further advantage of this invention to provide strong encryption for card transactions in environments which currently do not support the required level of security. One such application is in using a cell phone as the communication transport for a card transaction. Many mobile card processing companies are currently using Pocket PC or java enabled phones with magnetic stripe readers to provide this payment processing service. While Pocket PC and java is generally considered a more secure platform than WAP, it is still open to compromise. Current cell phones are not "hack" proof, and have been known to be "hacked." A rogue program in a phone processing card transaction could capture card data and consequently not adhere to the security standards of VISA® and Master Card®

In addition, certain implementations of the java do not include the required strong encryption. As in the WAP description encoding the data in the MSR module removes the need to rely on java's security level, Java based card transaction applications have an addition benefit in that the java application is capable of sending data to the secure MSR module. In this way, the encryption engine in the module can be used by the java application with the appropriate keys to encrypt any sensitive data. In addition, since java enabled phones provide for bidirectional data transmission to the card reader additional security functions can be supported. A public key encryption can be used to exchange the strong symmetric keys between the reader and the processing server application, removing the need for the special card swipe required to change the keys in a WAP enabled reader.

It is yet a further advantage of the present invention to prevent the components from a magnetic stripe reader incorporating this technology to be cannibalized and used to fabricate a "skimming" device. Credit card readers routinely show up in the surplus market. It is a simple matter to use the components from such a device to fabricate a card reader for "skimming" card data. The present invention is of value only to the holders of the encryption keys. Once the module is discarded and the keys destroyed, the module cannot be used to fabricate "skimming" devices.

It is yet a further advantage of the present invention to allow the replacement of the conventional magnetic head used in card reading equipment. Current card readers simply output the magnetic stripe data with no other information. The present invention allows encrypted data be outputted along with a serial number which must be also outputted simultaneously to reference the correct keys for the encrypted data's decryption. This serial number enhances security and is also useful in many applications for tracking the movement and use of the secure modules. If an MSR employing the present invention is stolen or attempted to be used in a fraudulent fashion the serial number and other information encrypted with the card data can be used to detect the unauthorized use.

It is yet a further advantage of the present invention to allow the replacement of the conventional magnetic head used in card reading equipment. Current card readers simply output the magnetic stripe data with no other information. The present invention allows encrypted data be outputted in a data format that is compatible with clear text formats. The decrypting and data format restoring application uses the keys previously saved and indexed to the attached POS or PDA device being used. This is also useful in applications where data is found that has been miss-appropriated. The encrypted data can be test decrypted by all know keys and when the data decrypts correctly the terminal and location of the data source can be determined. If an MSR employing the present invention is stolen or attempted to be used in a fraudulent fashion the decryption key will not be correct and the data will be useless.

It is yet a further advantage of the present invention to allow for the supplier of magnetic stripe reading enabled equipment using this invention to allow there customers to limit or prevent the use in other than the applications desired by the supplier. If an e-commerce business, such as Amazon.com® wants to supply a reader to their repeat customers to get a swiped transaction rate from the bank or to use the magnetic stripe on a driver's license for an identification (ID) check they can do so while preventing the readers from supplying similar information to their competitors.

It is yet a further advantage of the present invention to allow for the manufacturers of handheld computing devices including cell phones and PDAs to integrate this MSR module in their equipment providing greater functionality in a smaller package, and lower cost, implementing a reader using conventional art.

It is yet a further advantage of the present invention to allow for multiple keys to be used to encrypt multiple data packets for use in specialized applications. In the wireless applications mentioned above, the security of the card data is enhanced from the point that the card is swiped to the bank which holds the keys. The authenticity of the swipe card is not questioned. Using multiple data packets encrypted with separate keys and placed in the standard track data format the card data is encrypted with keys held by the bank and a secure stripe signature packet is encrypted with keys held at a secure stripe verification data bank. The transaction data is first sent by the cell phone or other POS device to a secure stripe verification internet site the card signature packet is decrypted and the signature compared to the data base. The card rating from the signature comparison is sent with the encrypted card data to the requesting bank. The bank gets additional information on the cards authenticity while keeping secret the card data. Since all card verifications go though a single signature database card authenticity is shared among multiple institutions without sharing card data information.

It is yet a further advantage of the present invention to allow the encrypted magnetic head module to communicate with an encrypted pin pad module to present an ATM transaction terminal for handheld computing devices. An encryption engine similar to the one used in the head module is placed in a sealed keypad module with or without a display unit. The head module and keyboard module communicate through encrypted data packets preventing unauthorized monitoring of the secured information. The combined information from both units is combined into an encrypted data packet of a format that the cell phone, PDA, or other handheld computing device can pass on to the processing gateway or bank.

It is yet a further advantage of the present invention to provide an attachment for handheld computing devices containing the encrypted magnetic head module to provide secure credit and debit card reading for mobile POS transaction processing.

It is yet a further advantage of the present invention to provide an attachment for wireless enabled handheld computing devices containing the encrypted magnetic head module to provide secure credit and debit card reading for mobile POS transaction processing.

It is yet a further advantage of the present invention to provide an attachment for handheld computing devices containing the encrypted magnetic head module and a wireless transceiver along with a compatible wireless gateway to provide secure credit and debit card reading for mobile POS transaction processing.

It is yet a further advantage of the present invention to allow the encrypted magnetic head module to communicate with a real time clock or a global positioning system (GPS) receiver either internal to the phone or reader to tag all data transaction with date, time and location information. This is especially required in POS financial transaction that are mobile to verify where and when the transaction that the transaction occurred. Stamping the data with the date and time prevents the encrypted card information from being recorded and used to make multiple transactions at a later date. The time stamped in the encrypted transaction is compared with the transaction processing server and if out of date the transaction is rejected and a new card swipe requested. If the new card swipe date stamp is equal to the previous data a fraudulent transaction is flagged. If the date stamp is out of date by an amount equal to the duration between stamps, the transaction is allowed and the date inaccuracy noted in the servers transition data base. In the same manner, if a real time clock is not available the secure module increments a counter for each transaction the reader makes. The processing server compares the count in the current encrypted transaction request to the last received count. If the count is greater than the previous count, the transaction is accepted and the new count stored in the transaction data base. In addition to providing for testing for reused previously recorded transaction data, the counter is used to change the encrypted transaction data. The output for swiping the same card multiple times will always be different Therefore any data stolen from the merchant's servers can not be reused to make a duplicate transaction.

It is yet a further advantage of the present invention to provide a method for using the secure head module in a POS application to secure transaction data in a much more secure fashion than current card transaction terminals allow in both wired and wireless applications.

It is yet a further advantage of the present invention to provide a method where the secure magnetic head can be retrofitted in legacy transaction terminals to enhance their security and longevity of operation.

It is yet a further advantage of the present invention to provide a method for the manufactories of transaction terminals to lower there manufactured cost of the equipment while providing greater security and functionality to there customers. The secure reader module is a low cost alternative to conventional read apparatuses used in POS terminals. In addition to providing security functions, the unit is much smaller and requires less power than conventional alternatives. In POS equipment designed with capabilities to communicate with the secure magnetic head other feature such as session keys and remote command and status are supported by the secure magnetic head.

It is yet a further advantage of the present invention to provide a method in which unsecured or weakly secured networks such as 802.11, Ethernet, Bluetooth, and WAP enabled cell phones can be used to allow for broader coverage in the application of mobile POS transaction processing. One such application would be in "line busting" at a coffee shop or an amusement park where the local 802.11 wireless network could be used in conjunction with the secure head module to provide the strong encryption required by MasterCard® and VISA® without the need to monitor, increase, or test the security of the wireless link. A transaction server application local to the local wireless server could store the transaction information to be batch processed at the end of the day, or forwarded to a corporate server via internet or any other transmission medium without concern for encryption or security mechanisms employed for the medium.

In addition, multiple mobile devices incorporating the secure head can communicate with a gateway server application using one or multiple networks in which the gateway server forwards the transaction information to the transaction processing server using any transaction medium without concern for mediums security. The gateway server would then relay the reply data from the transaction request back to the originating device. The reply data is formatted for the type of device originating the request, WAP, java, Pocket PC, or other based on device properties information stored with the secure magnetic reader encryption keys. In this way, any legacy or new device is supported by the system. In addition, different terminal types are transparent to the gateway server.

It is yet a further advantage of the present invention to provide a method for one or more internet and intranet secure gateway servers or accessible services to process the encrypted secure module track data and other transaction information into a format compatible with current credit and debit card transaction services data formats. These transaction services may be internet based or use dedicated connections such as leased lines for data transmission to the secure gateway servers. In this way secure transactions are insured without changing the current infrastructure. Gateway servers and accessible services provide similar functionality in different ways. A server requires that a connection be made to a web site using the http protocol and having specialized knowledge of the server while a service call can be made with little knowledge of the location's structure where it resides from within application software. To the application it is little different that a call to any other procedure contained within the application.

It is yet a further advantage of the present invention to provide a method for one or more internet and intranet gateway servers or services that can also provide for added functionality. In one such instance the gateway server receives transaction requests from multiple devices employing the secure MSR module. The transaction data consist of two data components the card data block and the control data block, each encrypted with different keys. The card data component keys are not held in the gateway and so the card data is unavailable to the gateway. The control block contains control information unique to the particular application and transaction device. In one case, the magnetic signature of the card swiped is also encapsulated in the control packet. The gateway decrypts the Secure Stripe® signature (Secure Stripe® security technology is the subject of numerous patents issued to Semtek Innovative Solutions, Inc. of San Diego, Calif.) and compares it against a local or remote Secure Stripe® database. The result of that comparison, along with other control information, is encrypted with the transaction process server's private key to which the transaction is being sent, and the transaction request forwarded. In this manner, the gateway makes the card signature verification check using an online signature database, and the transaction processing server makes the decision to accept or request the transaction request using the signature rating along with any other informational resources it has access to. In another instance the server or service provides a standardized interface to multiple transaction processing servers or banks. There are over one hundred different transaction processing gateways, each requires the data to be in a unique format, each also requires that interface to the processor be certified to operate correctly. With multiple services, each having common formatting of the transaction data to the secure head module and each service supporting one transaction processor, new processors can be support easily and efficiently.

It is yet a further object of the present invention to provide a method for encrypting the MSR clear text data to maintain format compatibility with the clear text data and what the legacy application require. In the case of credit/debit card transactions the data from tracks one and or two may be used by the POS application. Track two data is the most universally used and consists of a bank identification number followed by that 13-19 digit account number followed by the expiration date. This data is imprinted on the front of that card and is also contained in the track one data fields. Following the expiration date the track two data contains various data fields used by the processing bank to determine among other things if the card data was swiped or manually entered. In this invention selected track data is encrypted while other data remains unchanged. In one case the first four digits corresponding to the issuing bank, the last four account number digits, and the expiration date are left intact. The remaining track data is encrypted and placed back into the removed fields. Finally the mod 10 check character is updated to reflect the new account number. The data is then output to the POS application which checks the mod 10 check character to validate the card data, and then verifies the expiration date. The last four digits of the account number may then be displayed for the POS operator to verify against the account number on the front of the card. The POS application then sends the transaction to a processor possibly based on the bank ID number. The transaction processor forwards the card data received to a software service that decrypts and restores the original card data and format and returns the data to the transaction processor. The transaction processor then completes the transaction as it would in a normal legacy application It is yet a further object of the present invention to provide a method for encrypting the MSR clear text data to maintain format compatibility with the clear text data and what legacy applications require. In the case of credit/debit card transactions the data from tracks one and or two may be used by the POS application. Track one data contains the card holder's names, bank ID number, account number, expiration date as displayed on the front of the card along with various fields not displayed on the card's front. Depending on the specific application various data is masked prior to being output by the MSR. In one POS application the card holder's name is output along with the identifying information output from track two and all other data is masked. In another application a security signature used to verify the authenticity of the magnetic stripe is encrypted and output in the place of the account number or extended fields to allow the cards authenticity to be verified.

It is yet a further advantage of the present invention to provide a method of sending the track 1 data in a masked clear text format allowing legacy POS applications to record and print cardholder information deemed unnecessary to be encrypted for use in printing receipts and related tasks.

It is yet a further advantage of the present invention to provide a method of sending card authentication signature such as used in Secure Stripe card authentication system in the otherwise masked data fields of track 1 using an encrypted method similar to that used in the track 2 account encryption method shown. It should be noted that the encryption method and the data placement can be varied to suit a particular application and using the same method as previously shown for track 2 data is merely a convenience.

BRIEF DESCRIPTION OF THE DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 1 is an exploded view of the component parts of a secure magnetic transducer head module, constructed in accordance with the present invention;

FIG. 2 is a partially exploded view of a secure magnetic transducer head module, constructed in accordance with the present invention;

FIG. 3 is a perspective view of an assembled secure magnetic transducer head module attached to a card reader slot component, constructed in accordance with the present invention;

FIG. 6 is a side elevation view of a cell phone including an attached manual magnetic stripe card reader, constructed in accordance with the present invention;

FIG. 7 is a front view of a cell phone including an attached manual magnetic stripe card reader, constructed in accordance with the present invention;

FIG. 8 is a bottom side view of a cell phone including an attached manual magnetic stripe card reader, constructed in accordance with the present invention;

FIG. 9 is a top and side perspective view of a cell phone including an attached manual magnetic stripe card reader, constructed in accordance with the present invention;

FIG. 24 is a flow chart illustrating the enhanced data output format from an encrypted secure MSR transducer head at a point of sale (POS), in communication with a gateway which decrypts the card data and forwards the data to bank using secure data communication networks, constructed in accordance with the present invention;

FIG. 26 is a flow chart illustrating the enhanced data output format from an encrypted magnetic stripe read at the point of sale (POS), in communication with a gateway which forwards the encrypted data to the bank using and the bank uses previously stored keys to decrypt the card data, as constructed in accordance with the present invention;

DESCRIPTION OF THE PREFERRED EMBODIMENTS

Figure 4:
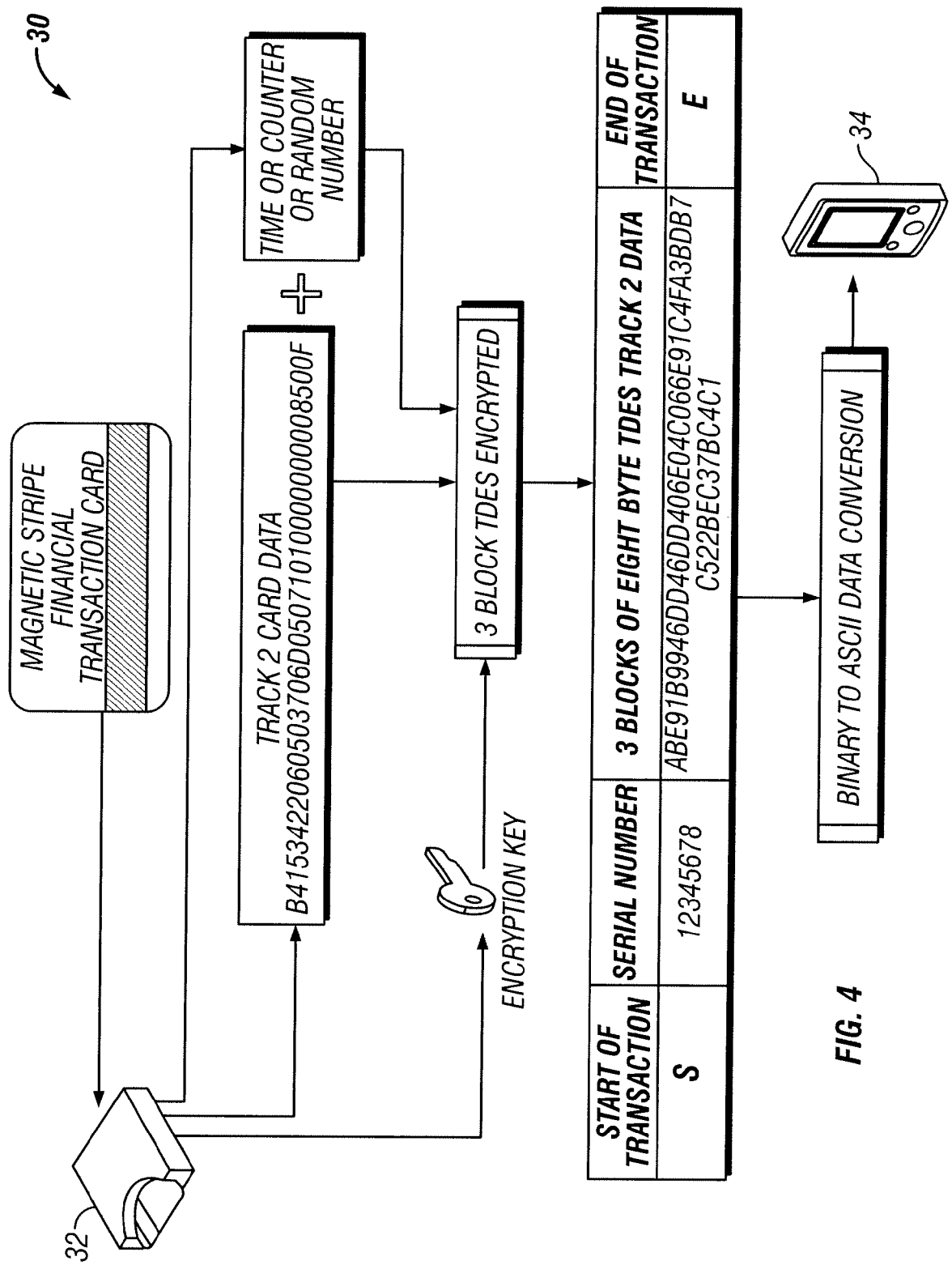
FIG. 4 is a flow diagram illustrating the standard data output format from a standard secure transducer head module, constructed in accordance with the present invention.

Referring now to FIG. 1, there is shown an exploded view of exploded view of a secure head module 10 illustrating the component parts thereof. The secure head module 10 is constructed of a protective metal end cap 12, a secure module PCB 14, a magnetic transducer head 16, and an interconnect flex circuit 18. The partially assembled secure head module 22 is attached to the interconnect flex circuit 18 prior to being affixed within the low jitter spring 24.

Referring now to FIG. 2, there is shown a partially exploded view of an assembled secure head module 26 with an interconnect flex circuit 18 (attached), and a low jitter spring 24.

Referring now to FIG. 3, there is shown a perspective view of an assembled secure head magnetic stripe card reader (MSR) 20 having a secure head module 26, wherein said secure head module 26 with interconnect flex circuit 18 is mounted within a card reader housing 28, and thereby ready to be incorporated into existing card reader units for the purpose of practicing the present invention and allowing for enhanced secure card reading transactions and communications.

Referring now to FIG. 4, there is shown a flow diagram illustrating the standard data output format from a standard secure transducer head module 30. Information stored on the magnetic stripe card is read by card reader 32, encrypted, and sent to a handheld computing device 34, such as a cell phone or a PDA.

Figure 5:
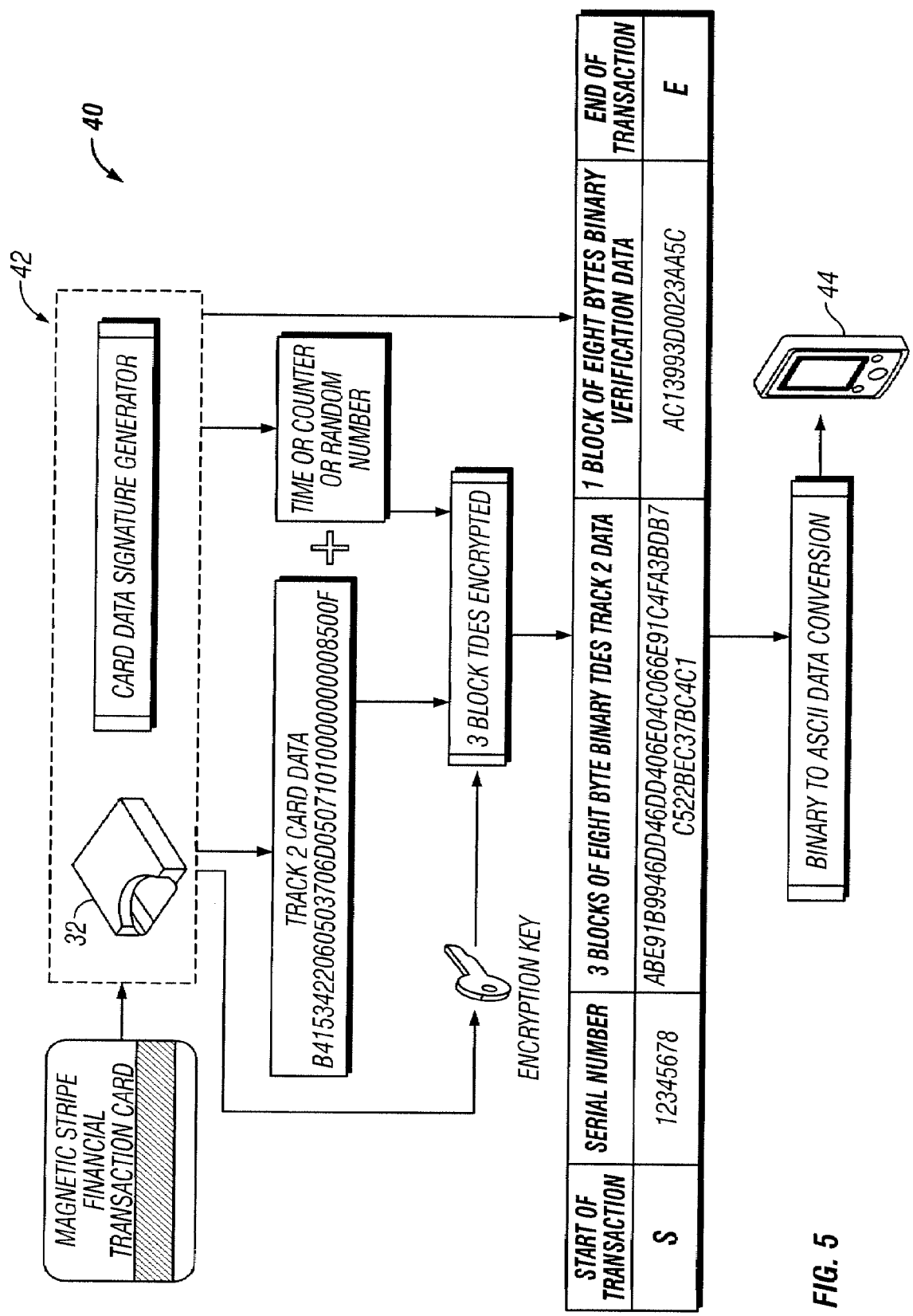
FIG. 5 is a flow diagram illustrating the enhanced data output format from an enhanced secure transducer head module with a card data signature generator, constructed in accordance with the present invention.

Referring now to FIG. 5, there is shown a flow diagram illustrating the enhanced data output format 40 from an enhanced secure transducer head module with a card data signature generator 42. Information stored on the magnetic stripe card is read by the card reader with a signature generator 42, encrypted with a card signature added, here as binary verification data, and sent to a handheld computing device 44, such as a cell phone or a PDA. The generated card signature date enables enhanced security during transaction data flow.

Referring now to FIGS. 6, 7, 8 and 9 there is shown a several views of a combination cell phone and manual magnetic stripe card reader 50 comprising a conventional cell phone 52 (here representing any handheld computing device) with an attached magnetic card reader 54. The magnetic card reader 54 is held in place on cell phone 52 by attachment arm 56. The magnetic card reader 54 includes a card slot 58 for swiping the card (not shown) containing data to be read, and an indicator LED 66. The magnetic card reader 54 is electronically linked to cell phone 52 via an HHCD interface connector 62 and communication cable 64, for the purpose of sending and receiving data and to allow the cell phone 52 batteries to power the card reader 54. The communication cable 64 leads to the card reader circuitry housing 68 to provide power and send and receive data. This card reader contains the secure head module (see FIGS. 1 through 3) which is the subject of this patent, and the card reader circuitry housing 68 contains both power management software, and the ability to generate standard and enhanced data formats for secure and enhanced security card transactions.

Figure 10:
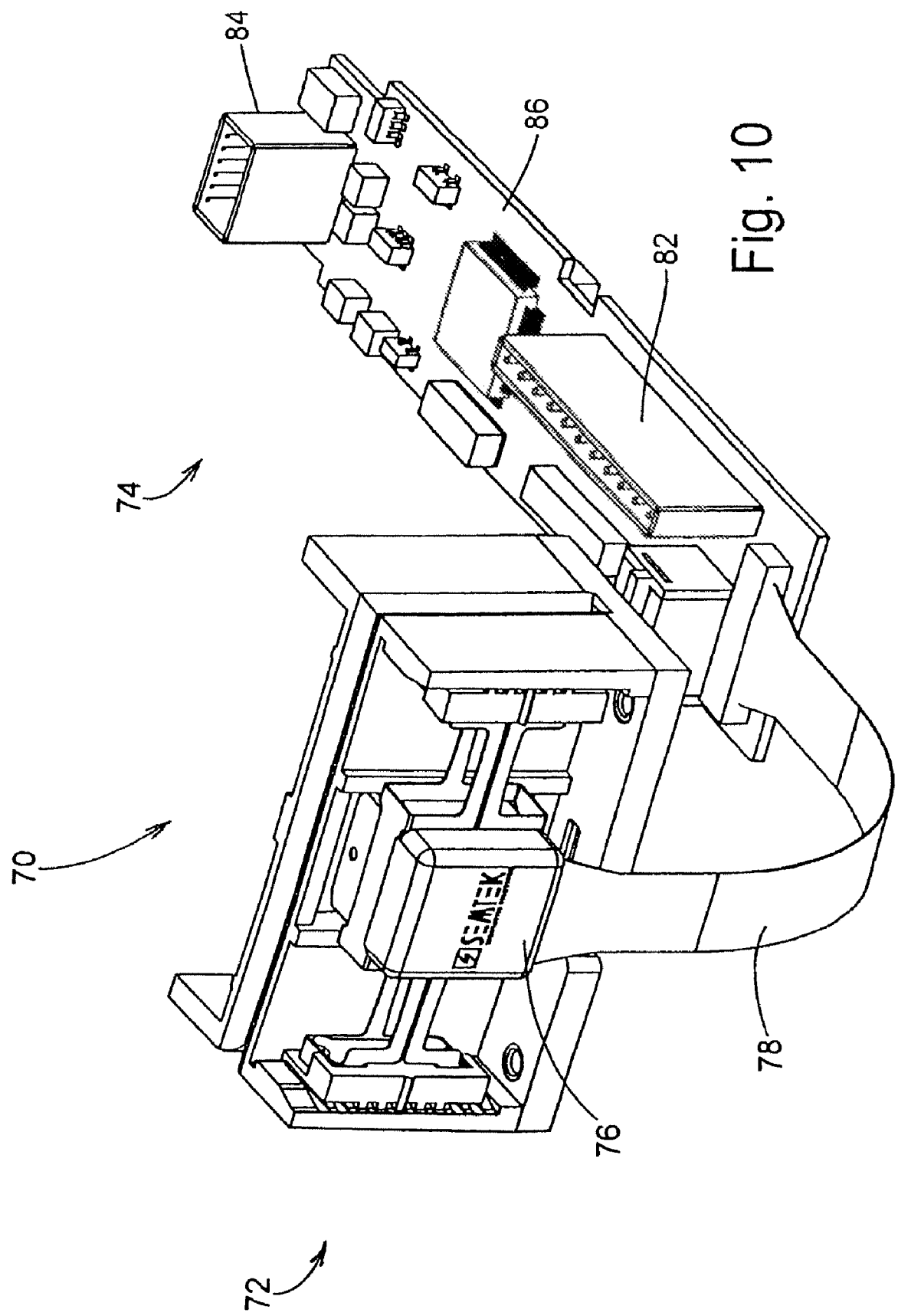
FIG. 10 is a perspective front and side view of a secure transducer head module attached to a reconfigurable processor/memory module debugger, constructed in accordance with the present invention.

Referring now to FIG. 10, there is shown a combination secure transducer head module and a reconfigurable processor/memory module debugger 70. The secure transducer head card reader assembly 72 is attached to the reconfigurable processor/memory module debugger 74 via a secure head data and debugger connector cable 78. The connector cable 78 extends from the secure head 76 to a contact point on the printed circuit board (PCB) 86 of the reconfigurable processor/memory module debugger 74. The reconfigurable processor/memory module debugger 74 includes both an external debugger interface connector 82 and a personal computer PC/terminal interface connector 84.

Figure 11:
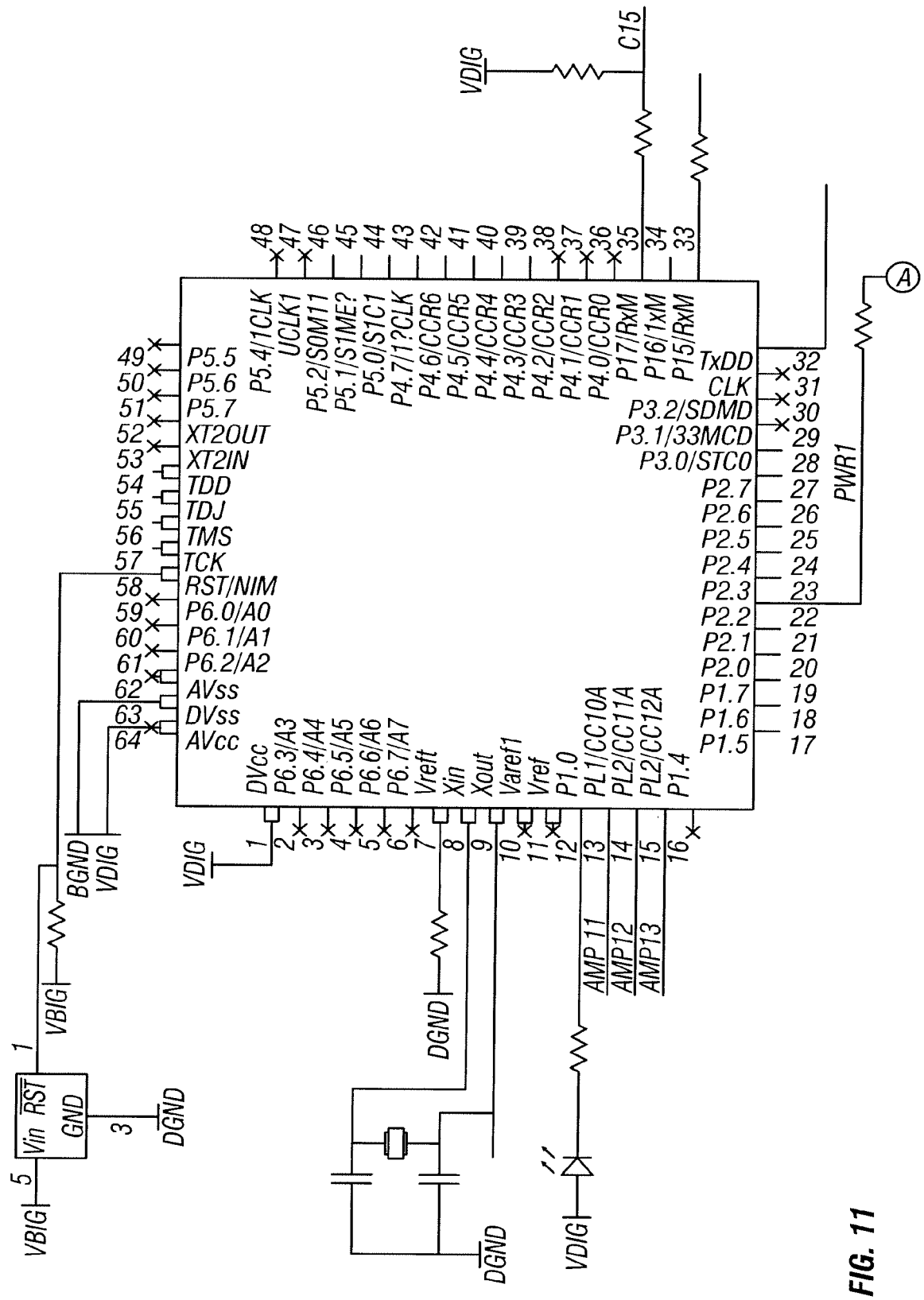
FIG. 11 is a schematic diagram and printed circuit board (PCB) layout diagram of a conventional magnetic stripe card reader, constructed in accordance with the current technology.
Figure 11:
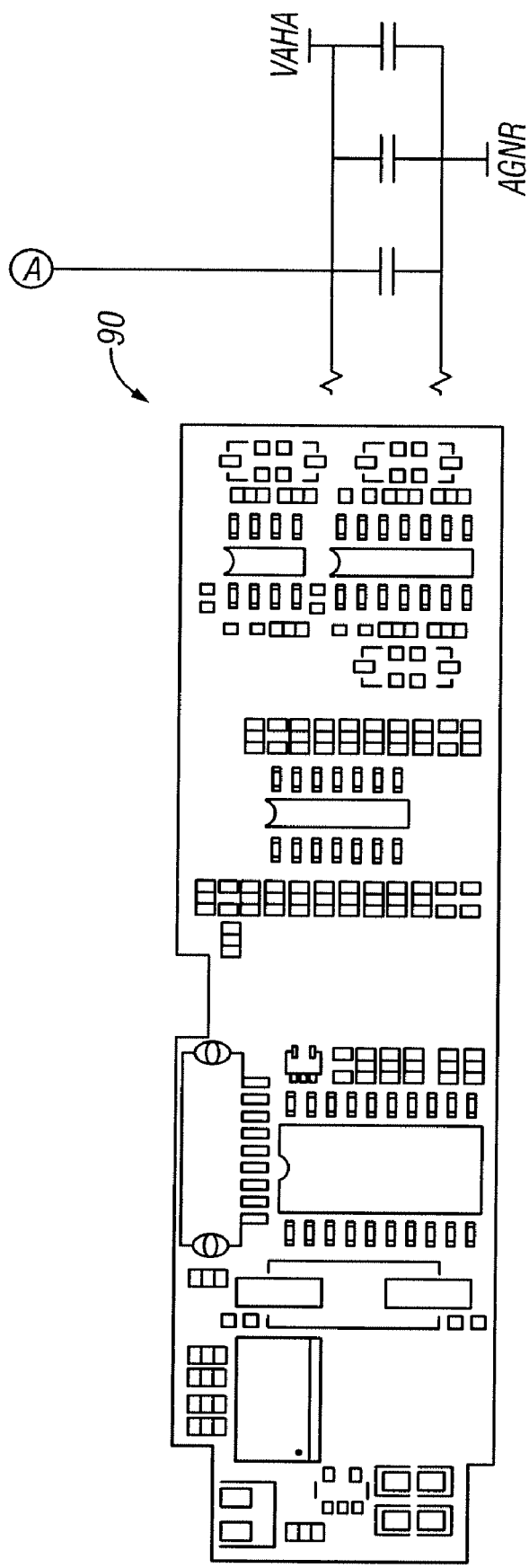

Referring now to FIG. 11, there is shown a schematic diagram and printed circuit board (PCB) layout diagram 90 of a conventional magnetic stripe card reader, constructed in accordance with the current technology.

Figure 12:
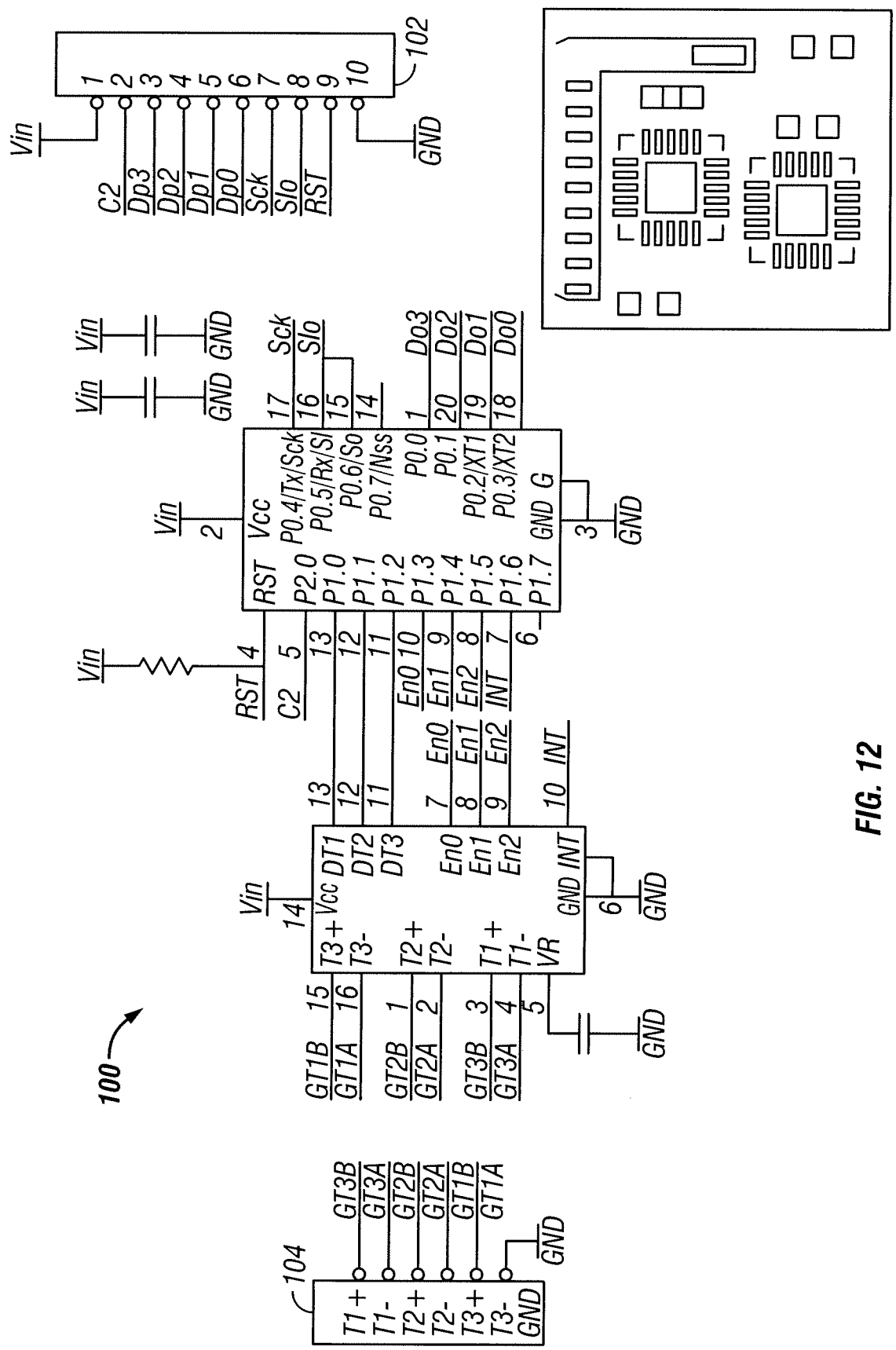
FIG. 12 is a schematic and printed circuit board (PCB) layout of a secure transducer head magnetic stripe card reader, constructed in accordance with the present invention.

Referring now to FIG. 12, there is shown a schematic diagram and printed circuit board (PCB) layout diagram 100 of a secure transducer head magnetic stripe card, constructed in accordance with the present invention. Data and electrical current flow from the magnetic head 104 to the output/control 102.

Figure 13:
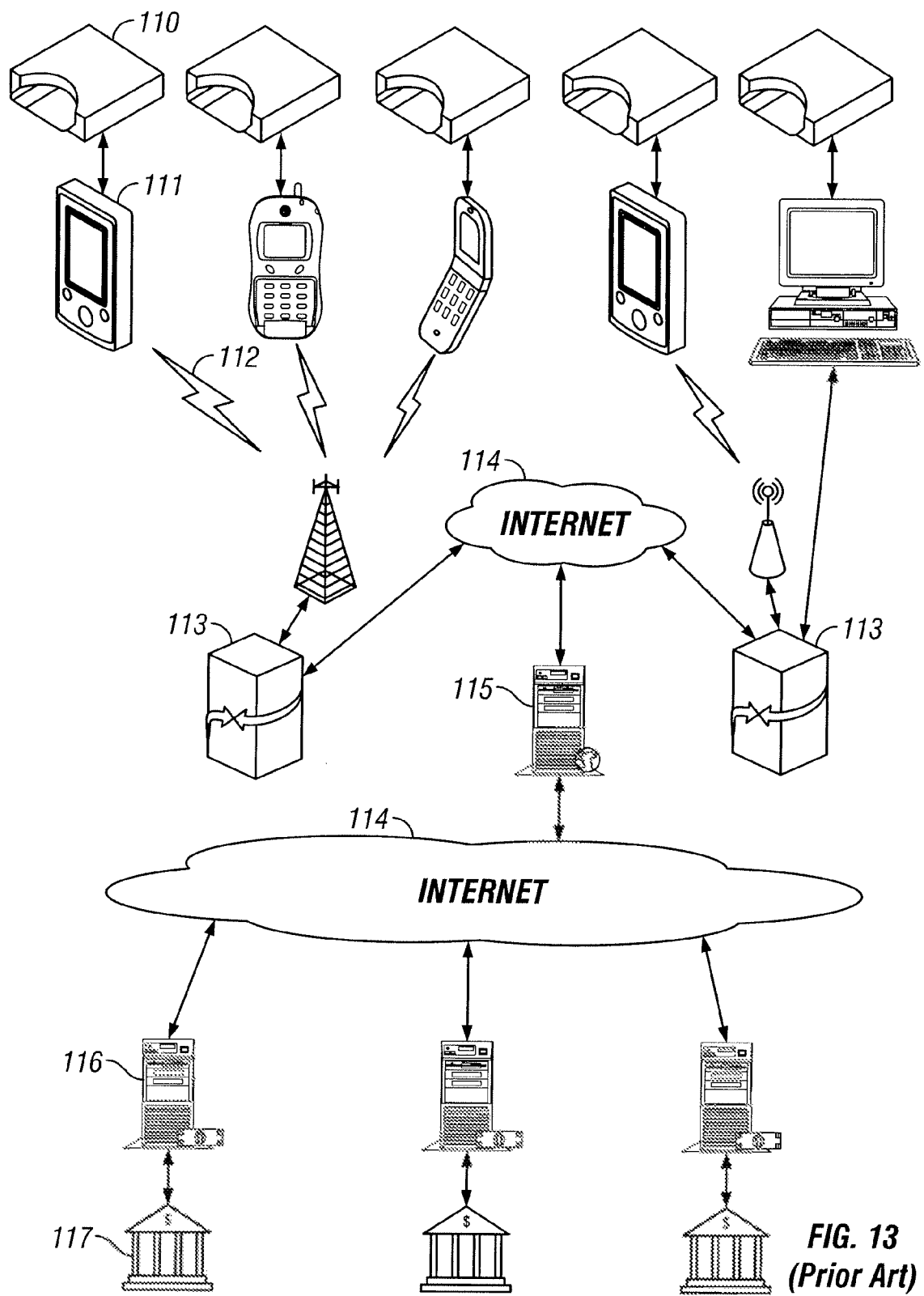
FIG. 13 is a flow chart illustrating the WAP and java application for legacy transaction server support, constructed in accordance with the prior art.

Referring now to FIG. 13, there is shown a flow chart illustrating the WAP and java applications for legacy transaction server support, constructed in accordance with the prior art. These WAP and java applications include unsecured connections between card reader's 110, wireless PDA's 111, smart phones and WAP enabled cell phones and the cell phone gateway over the RF link 112. Also, the links between the Internet 114 and the cell phone gateway 113, and the links between the Internet 114 and WAP or Java application servers 115 is not a secure connection. Thus, here in this wireless legacy system, the only secure connections exist between the Internet, the legacy transaction servers and the individual bank information systems (as shown in the lower half of this flow chart).

Figure 14:
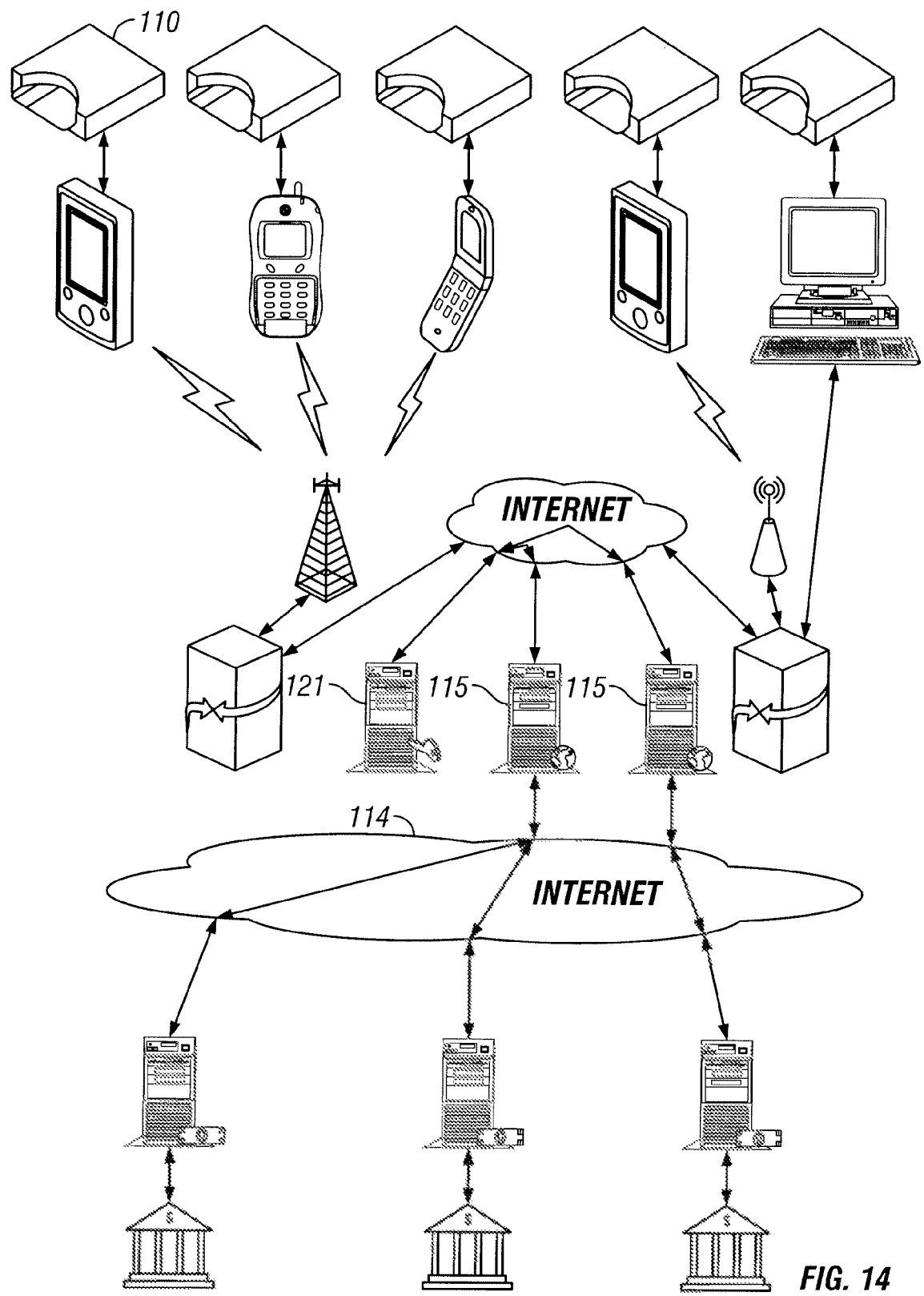
FIG. 14 is a flow chart illustrating the WAP application for legacy transaction server support (with no authentication), constructed in accordance with the present invention.

Referring now to FIG. 14, there is shown a flow chart illustrating the WAP application for legacy transaction server support (with no authentication). The card data is encrypted to CISP compliance at the secure module located inside the card reader 110 using the format indicated in FIG. 4. The encrypted card data is requested by the WAP application server 115 through the Internet 114. The application server requests the encryption key database server or service 121, through the internet 114, to accept the encrypted data and return decrypted transaction data using a secure internet (SSL) connection. The returned decrypted transaction data is formatted by the WAP application server suitable to the required transaction processor as prior to the addition of the secure module.

Figure 15:
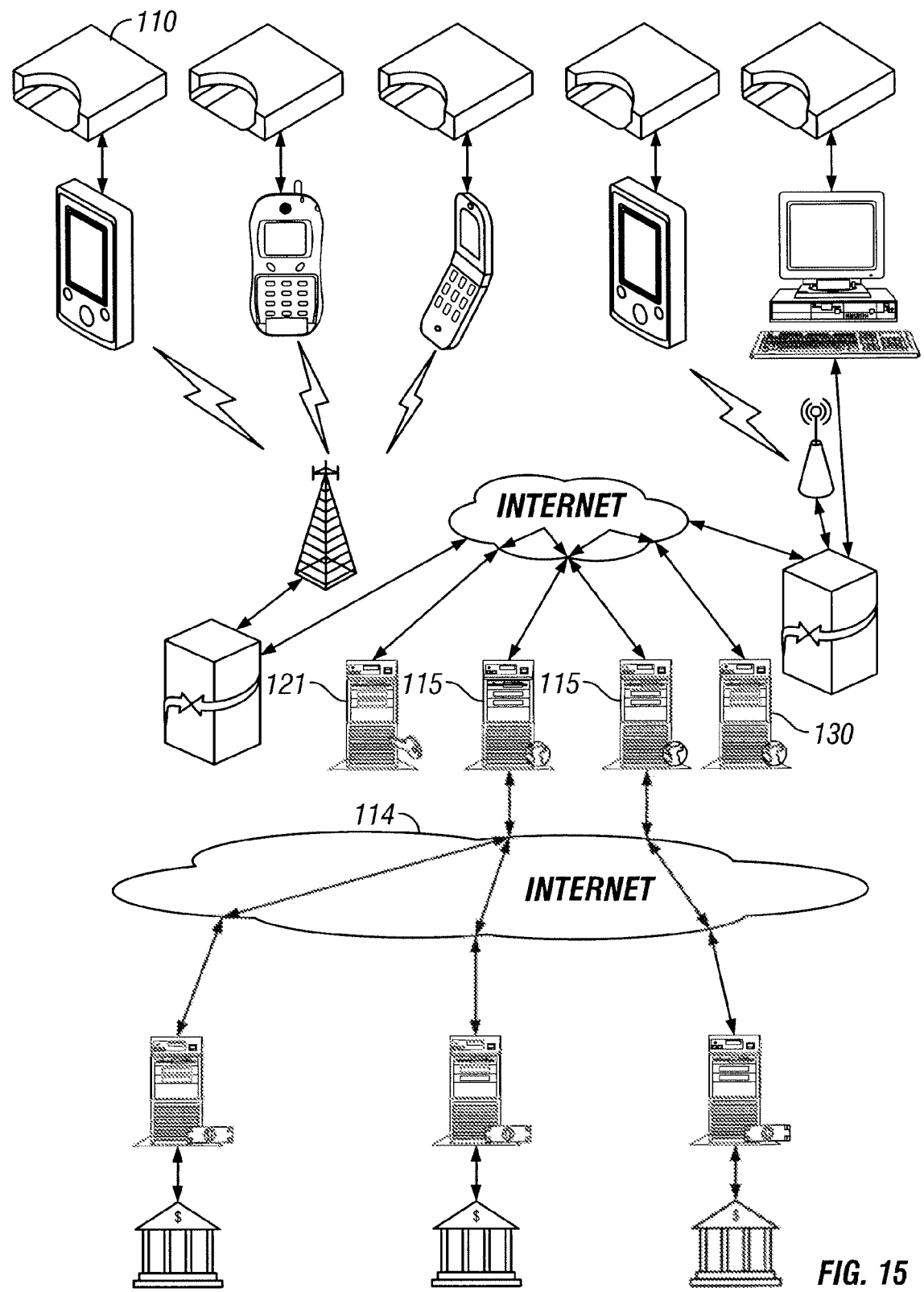
FIG. 15 is a flow chart illustrating the WAP application for a new transaction server support with Secure Stripes technology employed (authentication), constructed in accordance with the present invention.

Referring now to FIG. 15, there is shown a flow chart illustrating the WAP application for legacy transaction server support with Secure Stripe® technology employed (authentication). The card data is encrypted to CISP compliance at the secure module located inside the card reader 110, additional second block of encrypted data containing the magnetic stripes security signature and a one-way hash code of the card account number using the format indicated in FIG. 5. The encrypted card data is requested by the WAP application server 115. The application server requests the encryption key database server or service 121 to accept the encrypted data and return decrypted transaction data using a secure internet (SSL) connection. The application server requests the Authentication database server or service 130 to verify the magnetic stripe authenticity using the account hash code to index the stored signature value for the magnetic stripe. The results of the signature comparison are used to determine if the card transaction should be terminated or forwarded to the legacy transaction processor based on acceptance rules contained within the encryption database 121.

Figure 16:
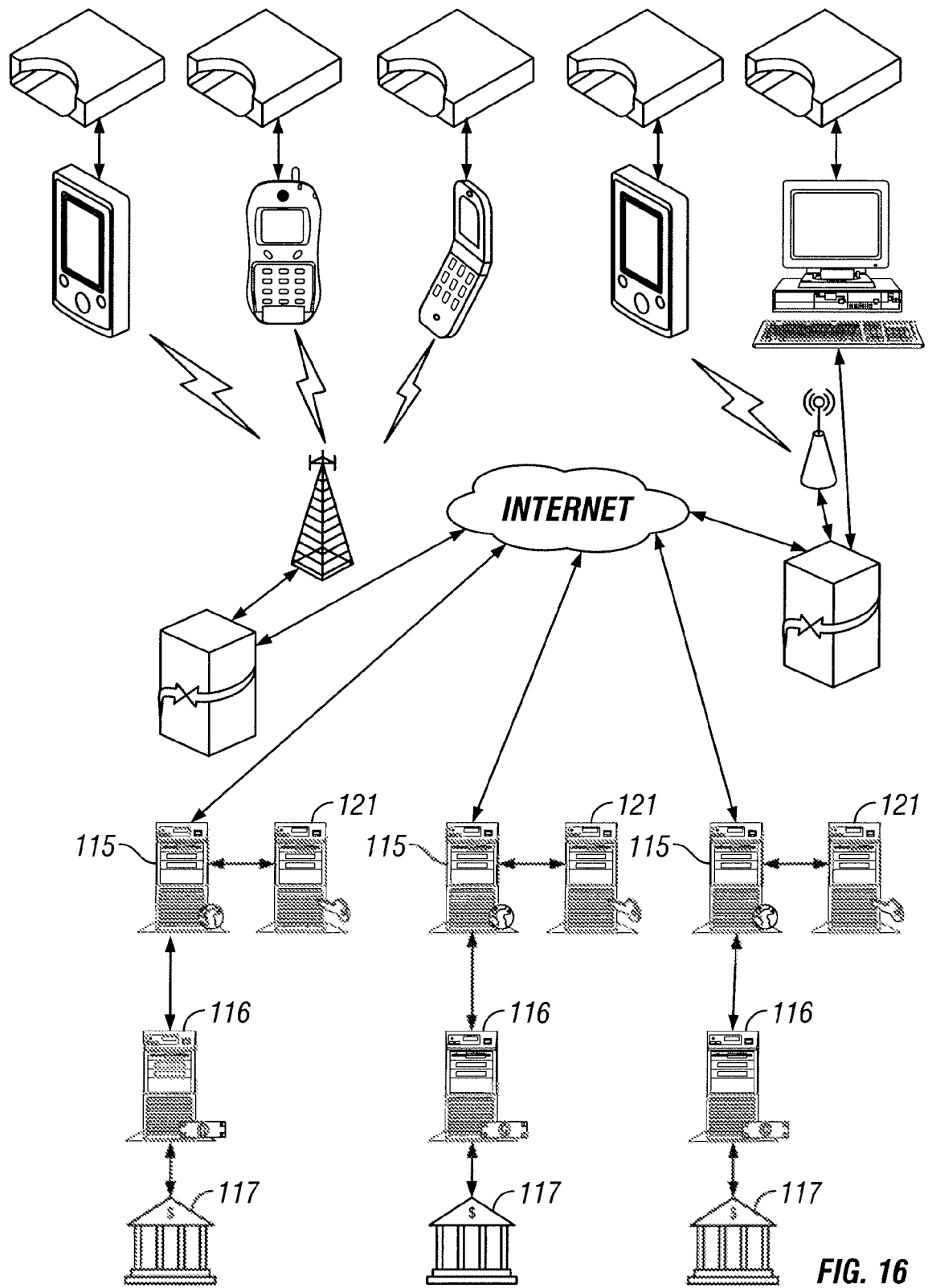
FIG. 16 is a flow chart illustrating the WAP application for a new transaction server (with no authentication), constructed in accordance with the present invention.

Referring now to FIG. 16, there is shown a flow chart illustrating the WAP application for a new transaction server (with no authentication). The card data is encrypted to CISP compliance at the secure module located inside the card reader 110 using the format indicated in FIG. 4. The encrypted card data is requested by the WAP application server 115 through the Internet 114. The application server requests the encryption key database server or service 121, which is located on the same intranet or within the same computer, to accept the encrypted data and return decrypted transaction data. The returned decrypted transaction data is formatted by the WAP application server suitable to the required transaction processor 116 and the transaction processed using current bank rules.

Figure 17:
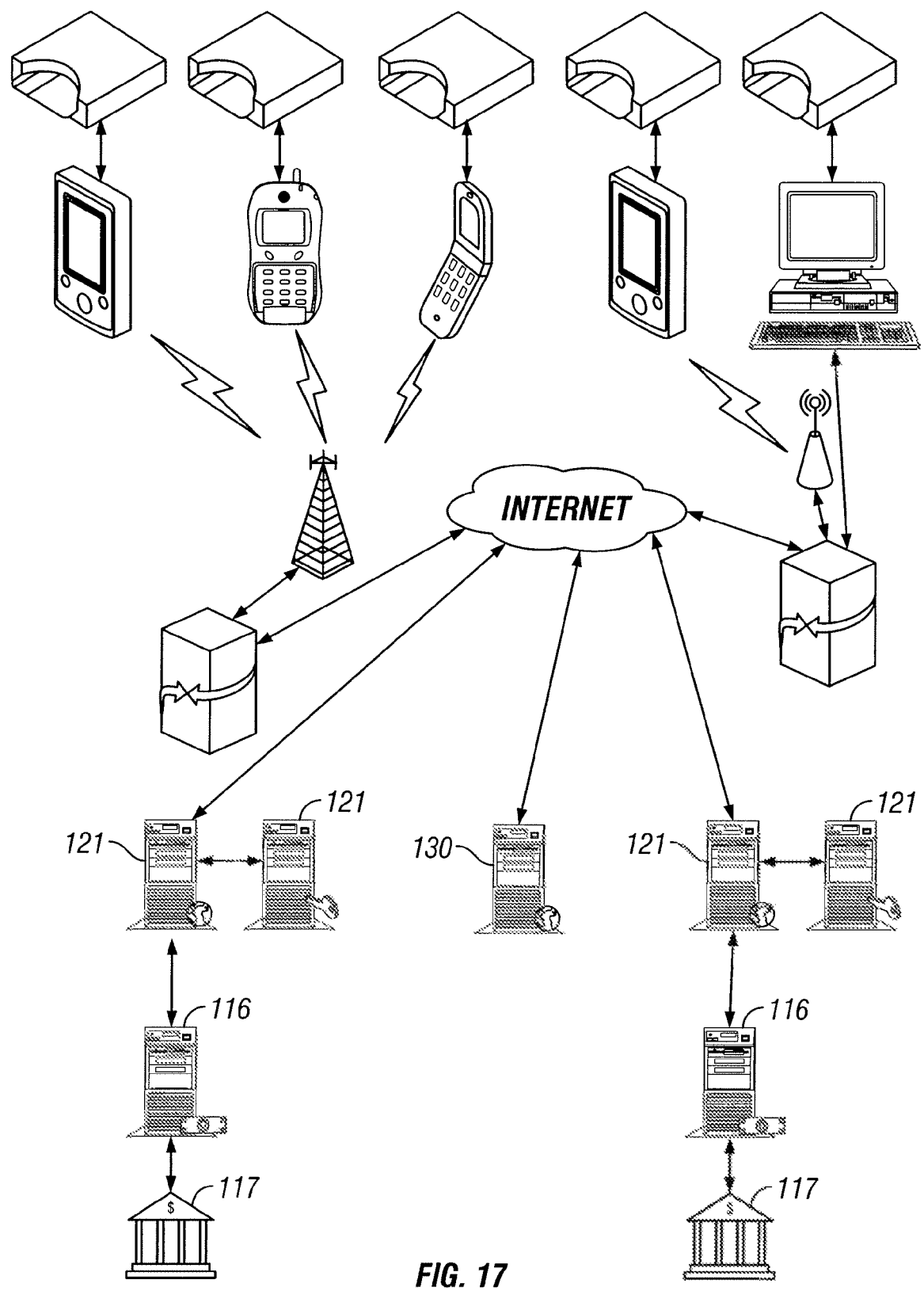
FIG. 17 is a flow chart illustrating the WAP application for a new transaction server (with authentication), constructed in accordance with the present invention.
Figure 18:
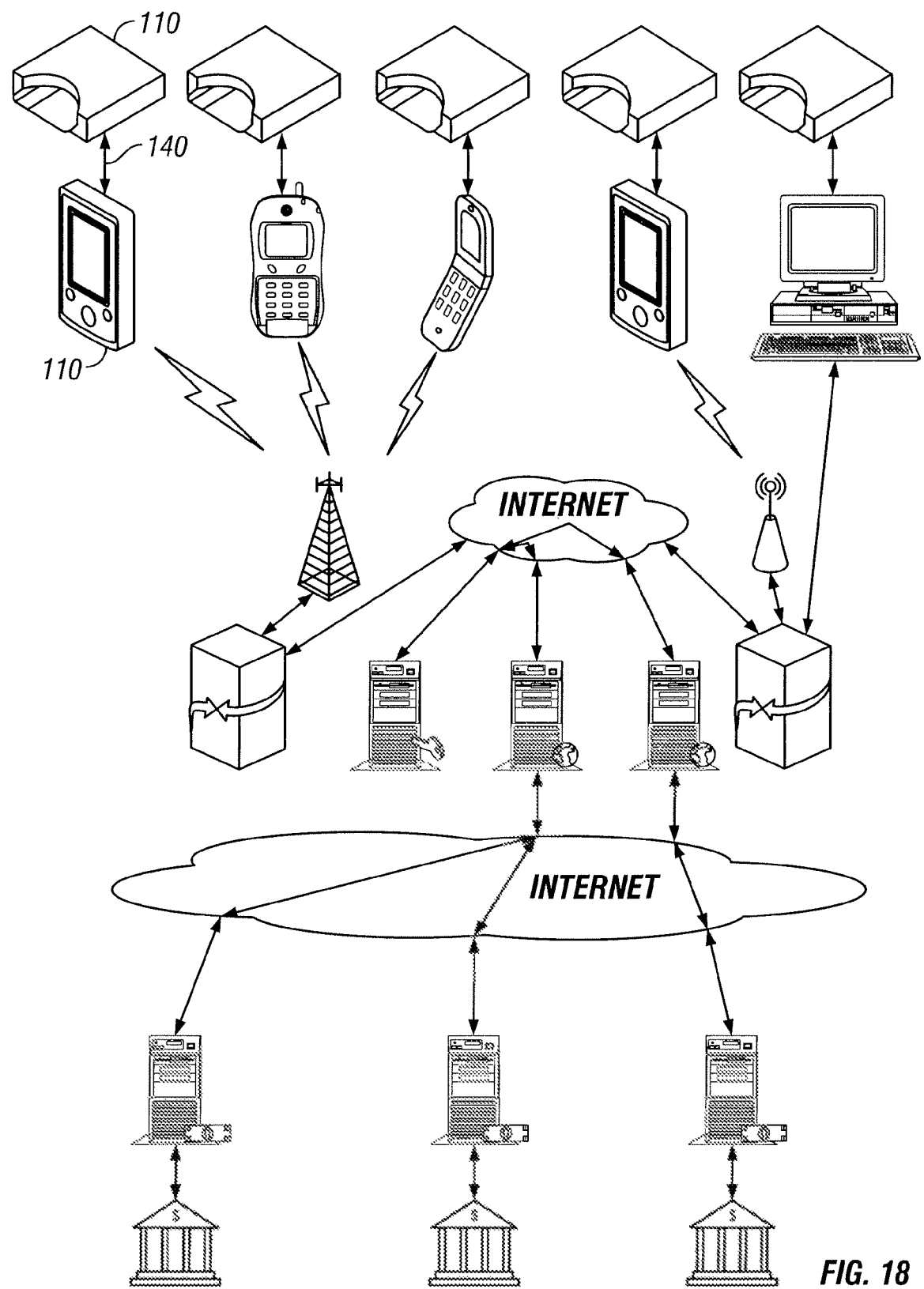
FIG. 18 is a flow chart illustrating the Java®/Pocket PC WAP application for legacy transaction server support (with no authentication), constructed in accordance with the present invention.

Referring now to FIG. 17, there is shown a flow chart illustrating the WAP application for a new transaction server (with authentication). The card data is encrypted to CISP compliance at the secure module located inside the card reader 110 using the format indicated in FIG. 4. The encrypted card data is requested by the WAP application server 115 through the Internet 114. The application server requests the Authentication database server or service 130 to verify the magnetic stripe authenticity using the account hash code to index the stored signature value for the magnetic stripe. The results of the signature comparison are used to determine if the card transaction should be terminated based on current bank rules. The application server requests the encryption key database server or service 121, which is located on the same intranet or within the same computer, to accept the encrypted data and return decrypted transaction data. The returned decrypted transaction data is formatted by the WAP application server suitable to the banks transaction processor 116 and the transaction processed using current bank rules Referring now to FIG. 18, there is shown a flow chart illustrating the Java®/Pocket PC WAP application for legacy transaction server support). While similar to FIG. 14, FIG. 18 supports greater functionality with the addition of bidirectional secure communication 140 between the secure head module 110 and the handheld computing device 111. This added communication channel allows for enhancements not possible using the system of FIG. 14. One primary enhancement is that the secure module can received data from the handheld device to be encrypted along with the card data such as the amount of the transaction. In addition the java or Pocket PC application running in the handheld device can request command and status operations of the secure module without the need for specially encoded cards as required by the WAP systems.

Figure 19:
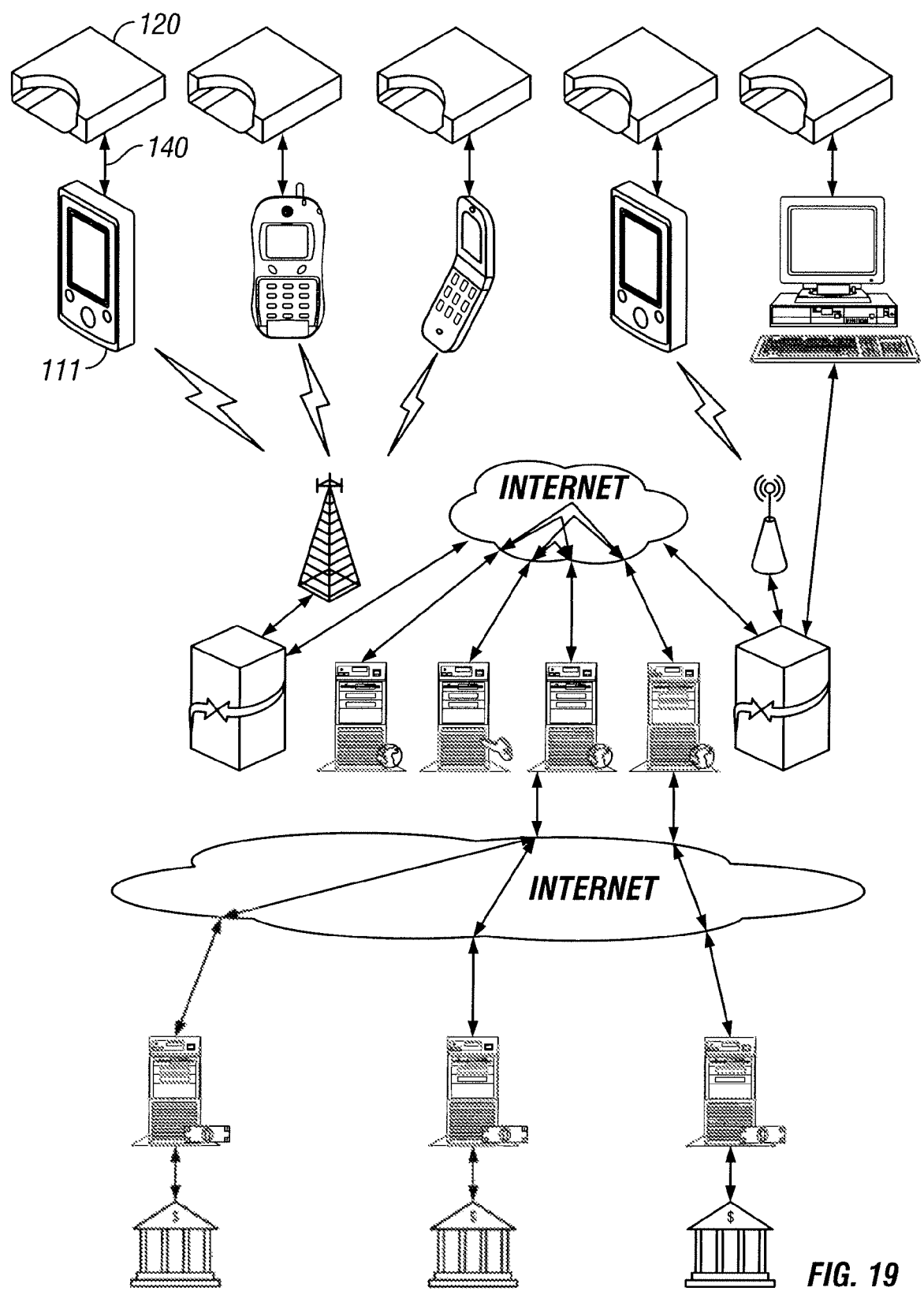
FIG. 19 is a flow chart illustrating the Java®/Pocket PC WAP application for legacy transaction server support with Secure Stripe® technology employed (with authentication), constructed in accordance with the present invention.

Referring now to FIG. 19, there is shown a flow chart illustrating the Java®/Pocket PC WAP application for legacy transaction server support with Secure Stripe® technology employed (authentication). While similar to FIG. 15, FIG. 19 supports greater functionality with the addition of bidirectional secure communication 140 between the secure head module 110 and the handheld computing device 111. This added communication channel allows for enhancements not possible using the system of FIG. 15. One primary enhancement is that the secure module can received data from the handheld device to be encrypted along with the card data such as the amount of the transaction. In addition the java or Pocket PC application running in the handheld device can request command and status operations of the secure module without the need for specially encoded cards as required by the WAP systems.

Figure 20:
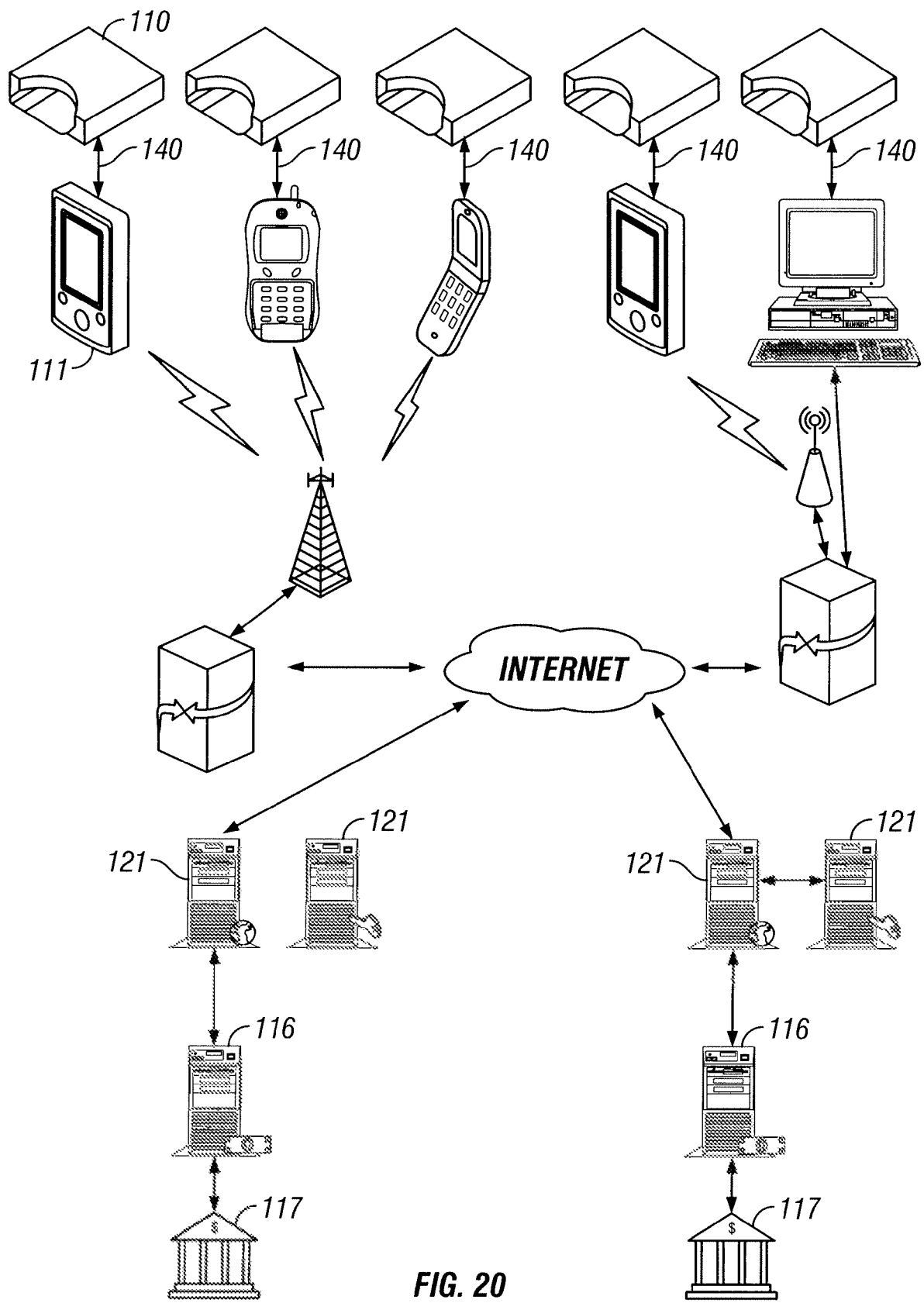
FIG. 20 is a flow chart illustrating the Java®Pocket PC application for new transaction server support (with no authentication), constructed in accordance with the present invention.

Referring now to FIG. 20, there is shown a flow chart illustrating the Java®Pocket PC application for new transaction server support (with no authentication). While similar to FIG. 16, FIG. 20 supports greater functionality with the addition of bidirectional secure communication 140 between the secure head module 110 and the handheld computing device 111. This added communication channel allows for enhancements not possible using the system of FIG. 16. One primary enhancement is that the secure module can received data from the handheld device to be encrypted along with the card data such as the amount of the transaction. In addition the java or Pocket PC application running in the handheld device can request command and status operations of the secure module without the need for specially encoded cards as required by the WAP systems.

Figure 21:
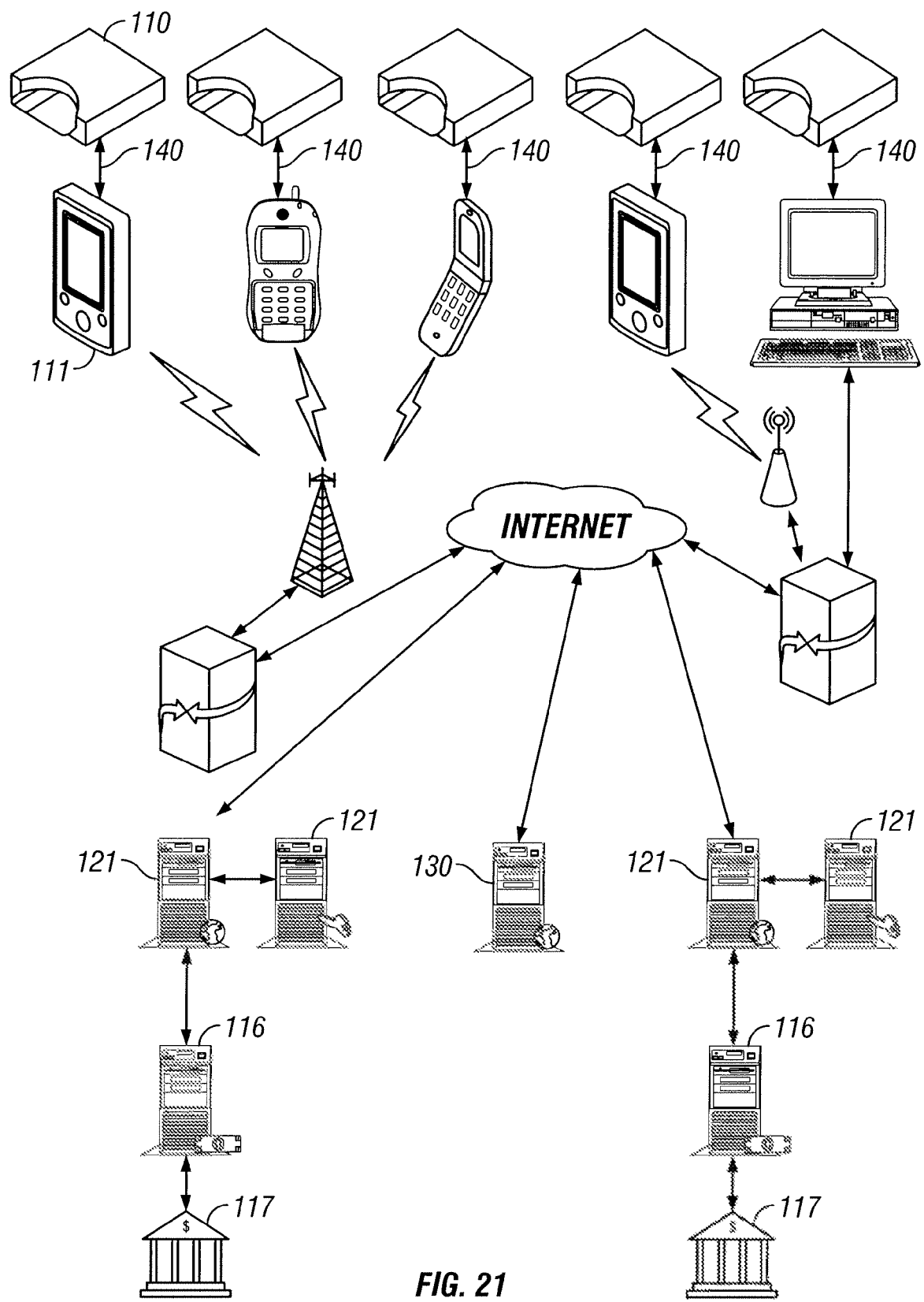
FIG. 21 is a flow chart illustrating the Java®Pocket PC application for new transaction server support with Secure Stripe® technology employed (authentication), constructed in accordance with the present invention.

Referring now to FIG. 21, there is shown a flow chart illustrating the Java®Pocket PC application for new transaction server support with Secure Stripe® technology employed (authentication). This system is similar to that illustrated in FIG. 20 above, however, here the wireless PDAs, the cell phone and the point of sale (POS) computer all are equipped with Java®/Pocket PC (PPC) and Java®/Windows XP applications). While similar to FIG. 17, FIG. 21 supports greater functionality with the addition of bidirectional secure communication 140 between the secure head module 110 and the handheld computing device 111. This added communication channel allows for enhancements not possible using the system of FIG. 17. One primary enhancement is that the secure module can received data from the handheld device to be encrypted along with the card data such as the amount of the transaction. In addition the java or Pocket PC application running in the handheld device can request command and status operations of the secure module without the need for specially encoded cards as required by the WAP systems.

Figure 22:
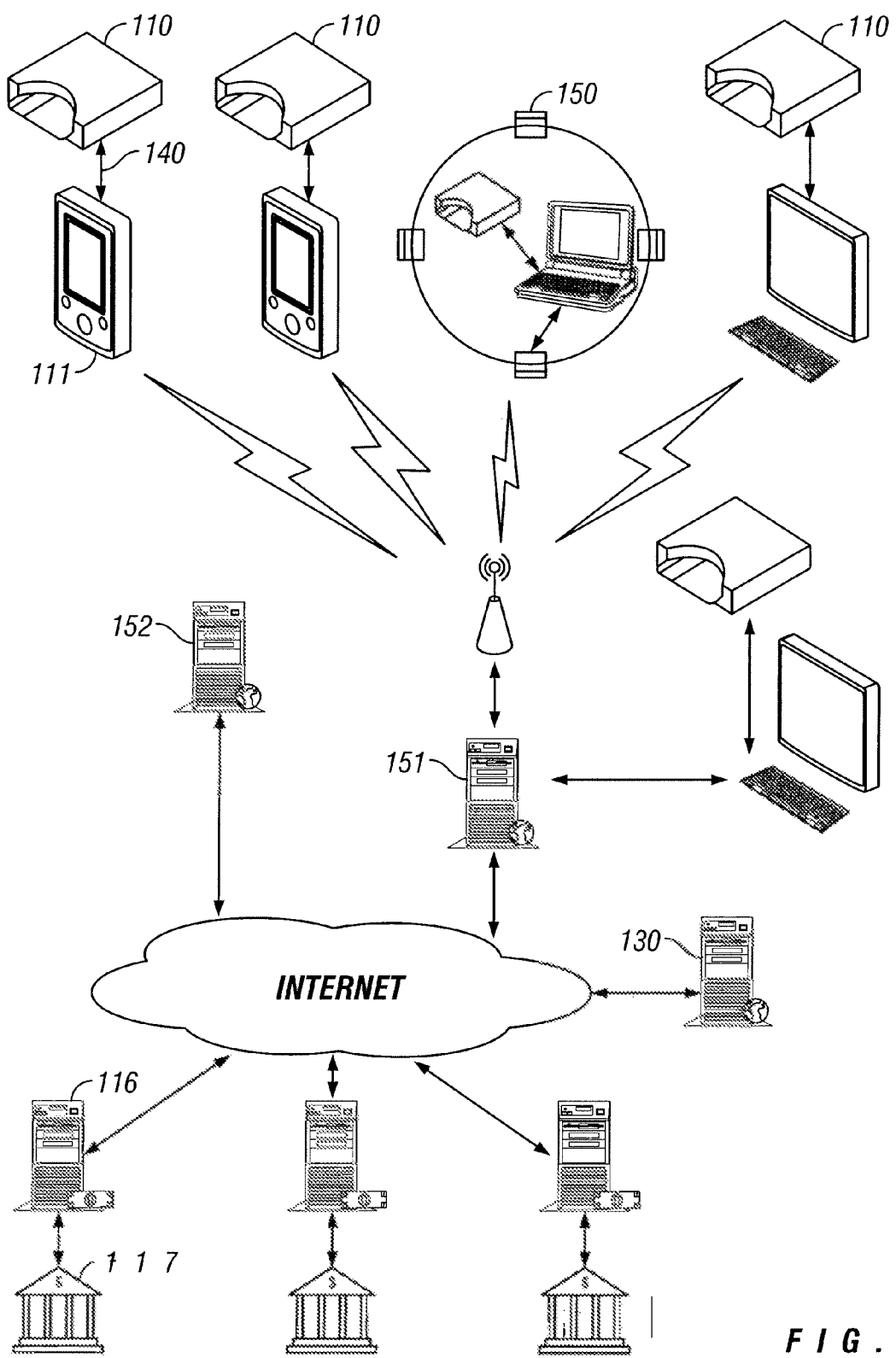
FIG. 22 is a flow chart illustrating a PDA MSR attachment with wireless link and compatible gateway to cell phone application, to access a wireless gateway, constructed in accordance with the present invention.

Referring now to FIG. 22, there is shown a flow chart illustrating a PDA MSR attachment with wireless link and compatible gateway to cell phone application, to access a wireless gateway. Here multiple PDAs 111, table mounted POS terminal with secure module for order entry and payment along with internet access 150, and a point of sale register with wireless capabilities are all connected to a wireless local area network (WAN) 152. This WAN, and any hard wired POS registers communicate with a local POS application server 151 which is connected via the Internet and secure connections to a TDES encryption database and transaction processing server. This TDES encryption database and transaction processing server then communicates via the Internet and secure connections to legacy or new transaction processors which in turn communicate via secure connections with bank information systems. Depending on the transaction processor used the local POS application server either requests the authentication server to verify the cards authenticity and sends that response along with the encrypted card data to the new transaction server or additionally requests the encryption keys and formats the data for a legacy transaction server. In an alternate method the POS server forwards the encrypted card and signature to an enabled transaction server to both authenticate and decrypt the card data.

Figure 23:
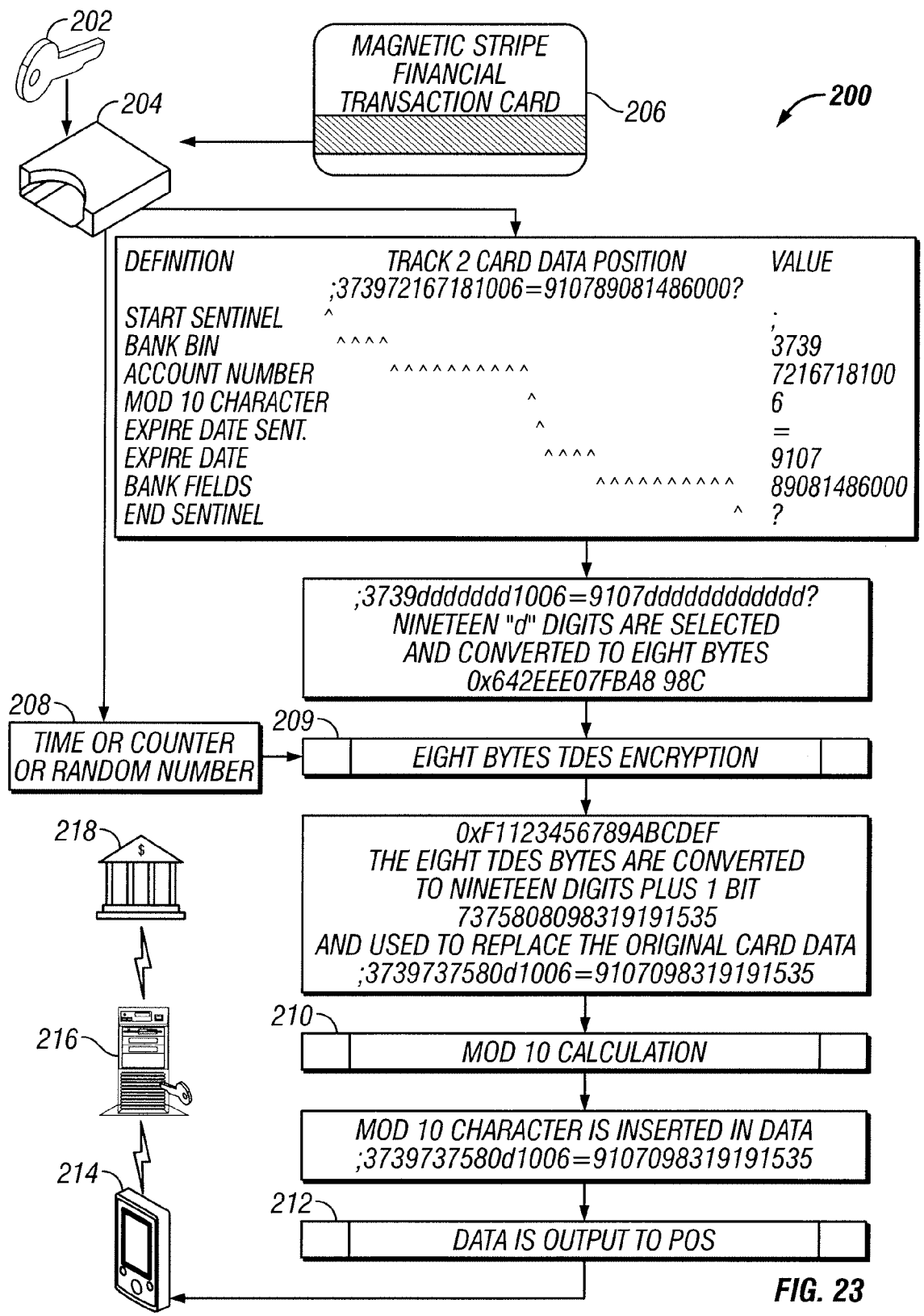
FIG. 23 is a flow diagram illustrating the encrypted and clear text track two credit and debit card data output format from an encrypted secure MSR transducer head compatible with legacy POS terminals as used in accordance with the present invention.

Referring now to FIG. 23, is a flow diagram illustrating the encrypted and clear text track two credit and debit card data output format from an encrypted secure MSR transducer head compatible with legacy POS terminals as used in accordance with the present invention 200, constructed in accordance with the present invention. With the current invention activated, selected card data is encrypted within the magnetic head or card reader 204. Various information from the track data is selected based on particular requirements of the POS system. In general the first for account digits representing the BIN or Bank Identification Number are left as clear text along with the card expiration date and the last four digits of the account number for the POS to use in card verification and receipt printing. Nineteen digits of the remaining card data are converted to an 8 byte binary value, a time function is added 206 and the result TDES encrypted using an electronic code book (ECB) block encryption 209. The 8 bytes of encrypted data are converted to a 20 digit base 10 number, the least significant 19 digits replace the selected card digits. The last digit is 0 or 1 and is added predefined to a bank field. A new mod 10 character is generated 210 and placed into the selected card digit. The combination of encrypted and clear text data output by the secure MSR module and is received by the POS or PDA device 214. The clear text is specific to the application software operating within the POS or PDA 214 allowing normal operation of the device with no or little programming changes. Data sensitive to the application is encrypted while maintaining the format of the original data from the magnetic stripe. After the encrypted data is sent to the processing bank via various secure and insecure networks the required keys are used to decrypt and reconstruct the original magnetic stripe data and format of the card data for processing. In this way, the secure system operates in essentially a transparent fashion, and can be adapted to any existing system already in place or yet to be invented. In an alternative method where the desired number of digits to be encrypted is other than the 19 as described or the encryption block size is larger than the available number of digits to be encoded an output feedback mode (OFB) or the counter mode (CTR) of block encryption may be employed. In these methods fixed data including such variables as the MSR serial number and portions of the clear text card data along with a changing value such as a counter incremented with each block output is encrypted using the desired encryption algorithm. The output bits from the encryption are XORed with the data to be encrypted. In the case that the card digits to be encrypted range for 0 to 9, as commonly found for track 2 data, 3 bits of the encryption are XORed with each digit from 0 through 7. The digits 8 and 9 are left in clear text. Since fewer steps are required for the CTR or OFB method there use may preferred over the ECB method.

In operation, MSR 204 reads the card magnetic stripe data. The data is then "tagged" by taking 19 "d" digits from the track 2 data and converting it to 8 bytes. Using a time or counter or random number generator 208, eight byte triple DES (TDES) encryption is coded using the encryption key stored in the MSR 204, and used to replace the original card 206 track 2 data. A Mod 10 calculation 210 is performed, and the mod 10 character is inserted into the data before data output to a POS 212. A PDA device 214 can then send the encrypted data to a server with an encryption key 216 before sending the original card data on to the designated bank 218.

In operation, the hidden DES system 220 illustrated in FIG. 24, allows for the reading of card data through encrypted MSRs at POS registers, for example a POS register at a store front 222, a POS register at a restaurant 224 and a POS register at an on-line ordering system 226. The read data is transmitted to a POS Gateway 1 228 for banks A and B, and another POS Gateway 2 232 for bank C and others. Each of the POS Gateways has an encryption key server, server 230 for gateway 228, and server 234 for gateway 232. The respective POS gateways then employ the bank communication network or networks to send data along a secure connection to legacy transaction processors 238, 240 and 242, which in turn send financial data to banks A 244, B 246 and bank C 248, via secure connections.

Figure 25:
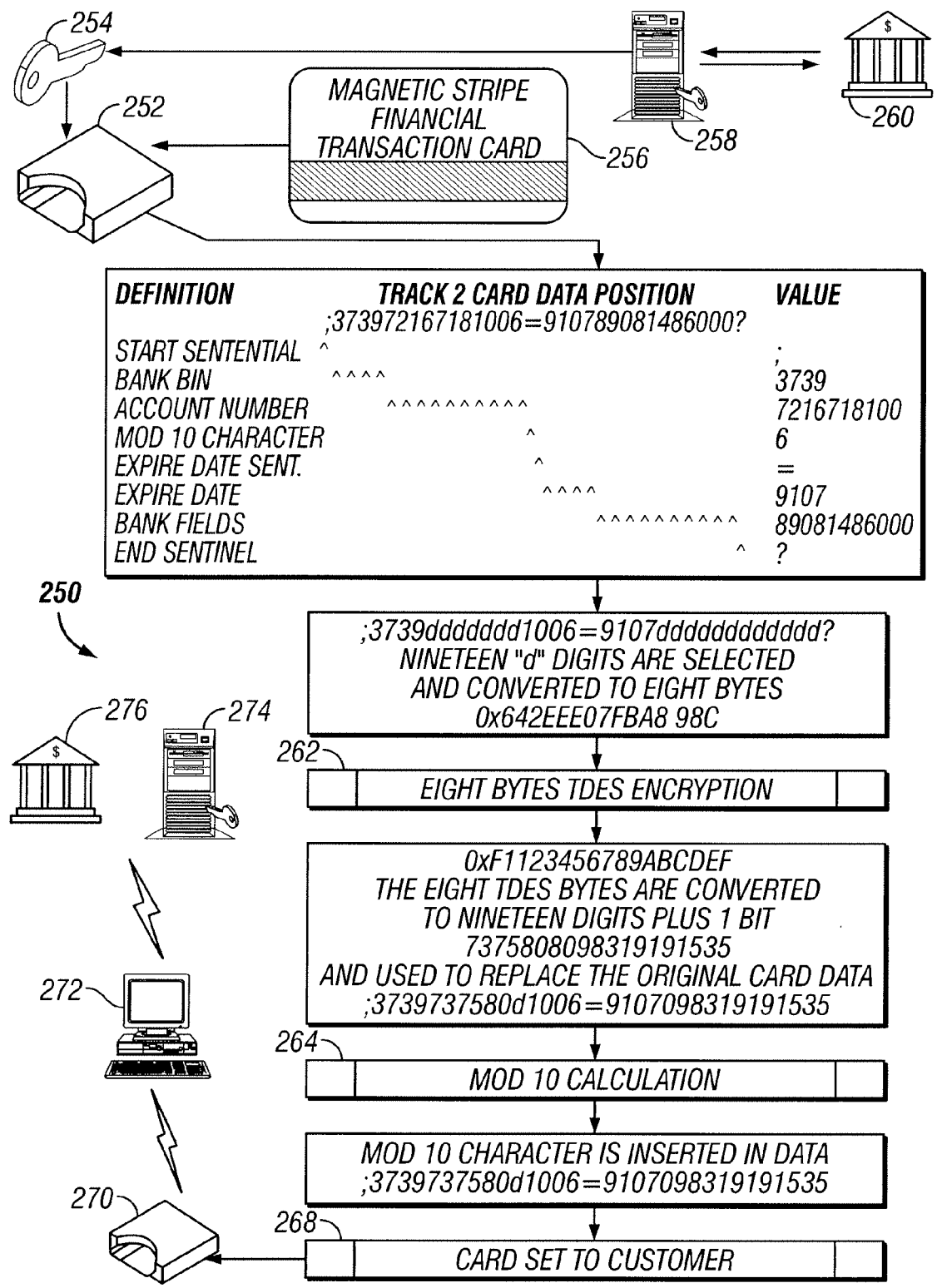
FIG. 25 is a flow diagram illustrating the encrypted and clear text track two credit and debit card data output format from encrypted magnetic stripe data encoded at the cards manufacture and compatible with legacy POS terminals as used in accordance with the present invention.

Referring now to FIGS. 25 and 26, there is shown the present invention in operation using a CPI compliant TDES standard to encode portions of the account data prior to encoding the cards. With the current invention selected card track data is encrypted during the manufacturing of the card. As with other embodiments of this invention the encrypted card data format is compatible with legacy or the current non-encrypted data format currently in use. The clear text information remaining in the stripe data is sufficient for legacy POS equipment to perform is current tasks without changing the current applications or infrastructure. After the encrypted data is sent to the processing bank via various secure and insecure networks the required keys are used to decrypt and reconstruct the original magnetic stripe data and format of the card data for processing. It should be noted that this application and the former where that card data is encrypted in the MSR are cross compatible and there would be significant benefits in using both techniques together. Encrypting the data in the reader attaches reader and POS information to the card while encrypting during manufacturing prevents standard card readers from reading and storing the data for illicit uses.

In operation, the CPI compliant TDES standard data format system 250, illustrated in FIG. 25 enables card manufacturing equipment 252 to receive an encryption key 254 from an encryption key server 258 as administrated by each individual bank, here bank 260, for example. Again, 19 digits are selected from the card's track 2 data position and converted to 8 bytes. An 8 byte triple DES (TDES) encryption engine 262 is used to produce the 8 TDES bytes which are subsequently converted to 19 digits plus 1 bit, and this is used to replace the original card track 2 data. A Mod 10 calculation is performed 264, and the mod 10 character is inserted into the data. At this point the card is custom manufactured for use and is sent to the customer user. When the customer uses the card at a POS terminal 272 the data is readily decrypted and confirmed by the banks key code server 274 and the information sent to associated bank 276.

FIG. 26 illustrates the CPI DES system 280. In operation, encrypted MSRs 282, 284 and 286 representing POS devices located at brick and mortar store fronts, restaurants, on-line ordering systems, etc., send financial data to one of two POS gateways 288 or 290, set up for communications to differing bank systems. Using a gateway to bank communication networks, the gateways 288 and 290 send information via secure connections to legacy transaction processors 294, 300 and 306. Each of the legacy transaction processors has an associated encryption key database relating to an individual bank. Following encryption by each encryption key database, the financial information can be forwarded to each bank 298, 304 and 310 via secure connections.

Figure 27:
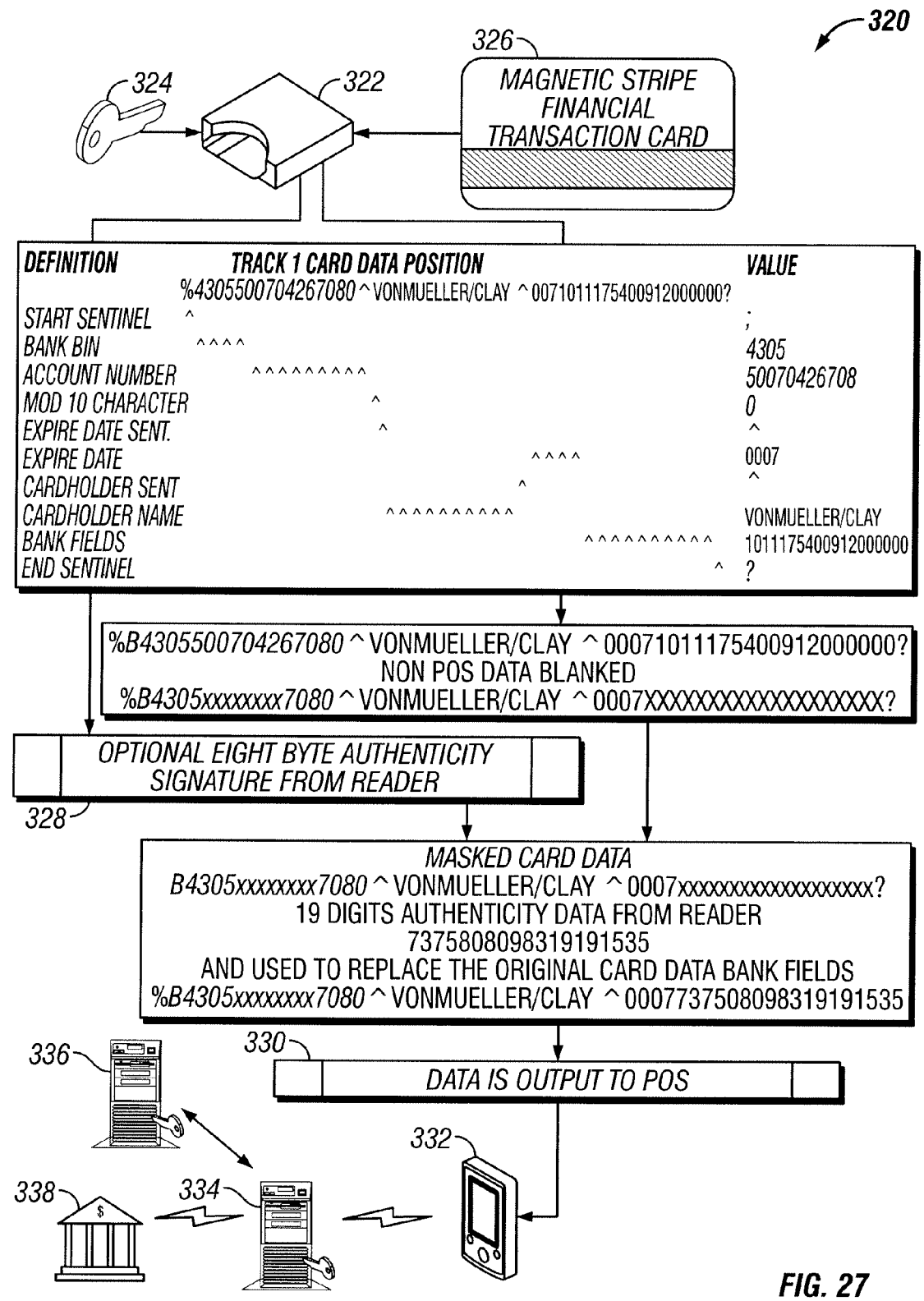
FIG. 27 is a flow diagram illustrating the enhanced data output format from an enhanced secure transducer head module with an optional card data signature generator and using the masked data format for track 1 data, constructed in accordance with the present.

Referring now to FIG. 27, there is illustrated a flow diagram of the enhanced data output format from an enhanced secure transducer head module with an optional card data signature generator using a hidden DES standard data format on track 1 data system 320, constructed in accordance with the present invention. In operation, the MSR 322 contains an encryption key 324 which is utilized to encrypt selected fields of track 1 data from the card 326. An optional 8 byte authenticity signature 328 from the MSR 322 sends masked data which is outputted to a POS 330. This data is then sent to a PDA device 322 and on to a decryption service module 334 linked to an optional card authenticity verification engine 336, before said data is sent on to the associated bank 338.

Figure 28:
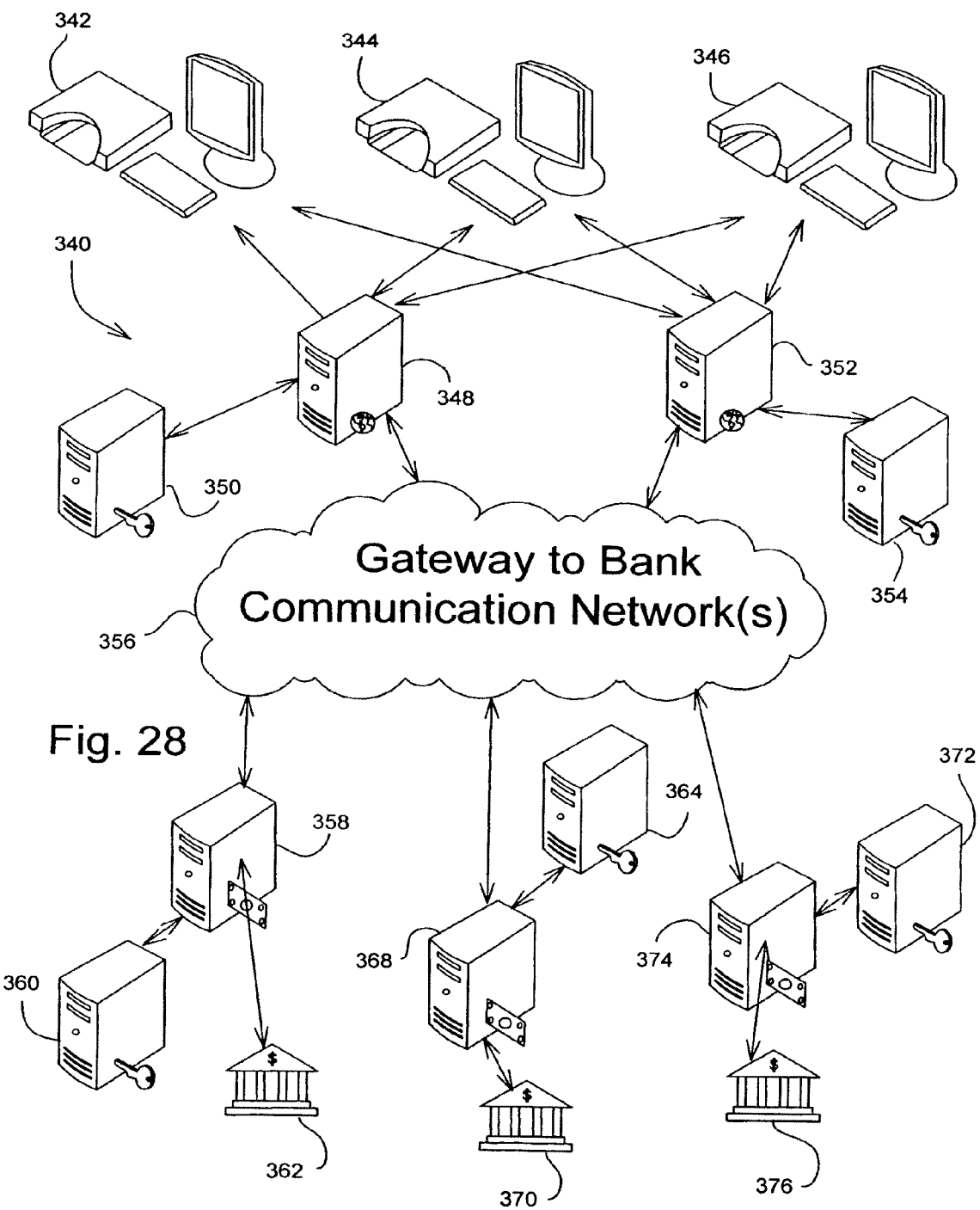
FIG. 28 is a flow chart illustrating the enhanced data output format from encrypted magnetic stripe data and an encrypted secure MSR transducer head module with a card data signature generator at a point of sale (POS), in communication with a gateway which decrypts the MSR encryption and to bank which decrypts the encrypted magnetic stripe, constructed in accordance with the present invention.

Referring now to FIG. 28, there is illustrated a flow chart of the enhanced data output format from an encrypted secure MSR transducer head module with a card data signature generator using the CPI and hidden DES system, at a point of sale (POS), in communication with a gateway to bank communication networks, constructed in accordance with the present invention. In operation, encrypted MSRs at various POS stations 342, 344 and 346 are linked to POS gateway 1 348 and gateway 2 352 which are in continuous electronic communication with encryption key databases 350 for gateway 1 348 and encryption key database 354 for gateway 2 352. The gateways 348 and 352 communicate via a gateway to bank communication network or networks 356 which direct the information via secure connections to legacy transaction processors 358, 368 and 374. Each legacy transaction processor is linked to an encryption key database 360, 364 and 372, associated with a particular banks IT system. In this way the financial data can be directed to each bank 362, 370 and 376 in a form which the banking system can read.

It is a further contemplated object of the present invention to provide a method of sending card authentication signature such as used in Secure Stripe® card authentication system in the otherwise masked data fields of track 1, using an encrypted method similar to that used in the track 2 account encryption method shown. It should be noted that the encryption method and the data placement can be varied to suit any particular application, and using the same method as previously shown for track 2 data is merely a convenience. Data from any information track can be encrypted and utilized for this method and technique.

The following examples of applications, implementation and operations allowed by the present inventive system are provided to demonstrate the scope and flexibility of the system disclosed herein.

EXAMPLE 1

In one preferred embodiment of the secure magnetic stripe reader module consisting of a custom ASIC based magnetic head amplifier with integrated precision peak detector attached to a magnetic head and a microcontroller to decode the output of the ASIC and provide TDES encrypted data. The ASIC and a conventional processor, the Silicon Labs C8051F330, are placed on a PCB the size of the back of the magnetic head. The interface cable is attached to the PCB and the assembly mounts in shell of the magnetic head. The head is then potted with epoxy providing a secure barrier to the environment tampering.

In high security applications a small amount of reactive material such as potassium is placed in the module prior to potting. If the unit is tampered with the reactive material is exposed and causes a reaction destroying the sensitive circuit components. In addition a fuse is placed on the PCB with allows the programming and debug connections to the microcontroller to be broken during final assembly of a product preventing access to the internal operations of the unit. The microcontroller decodes the F2F data encoded on the card and them uses multiple algorithms to decode the F2F data into any of multiple standard formats including ISO 7811, AAMVA, JIS, CDL, raw data, and other custom formats which may be added by the OEM using the module in a custom product. The converted track data is then encrypted to TDES using two 64 bit keys which where previously stored in the flash memory of the controller. The data is then compressed and output in one of multiple formats.

The data output format is selected using the head interface connector option pins of through sending a command through the Rx data pin. The interface formats which can be selected are $I^2C$, SPI, NRZ, or USB which all are well known standards. In addition TTL clock and data per track which is well known in the magnetic card reading industry may also be selected. An additional format can be supported which outputs the encrypted data in same F2F format which is encoded on the card at signal levels compatible with magnetic head output. This allows for legacy hardware to use the secure head module without changing the terminal hardware. In addition the secure head module can accept commands via the interface connector Rx data line or through the use of specially formatted cards which are swiped to execute the commands. An additional format can be supported which supports RF communications such as Bluetooth. The data is converted to a suitable format and sent to either a RF transceiver internal to the head module or connected to the head module though the interface connector cable.

These techniques allow for command operations in both WAP and java or Pocket PC thin client applications. In addition to the described card reader functions the unit provides general purpose digital input/output pins at the interface connector. These pins can be controlled by custom applications supplied by the OEM integrating the module in there products. These pins along with the ability to add custom application firmware to the head module allow for added functionality that without these options would require an additional processor and circuitry. One such example is in a serial RS232 stand alone magnetic stripe reader. The added interface pins can be used to control a status indicator and to control the RS232 output driver. In addition custom firmware can be added to output the suppliers banded information and to support custom formats such as those used at conferences to track attendees.

Example 1

An encrypted secure magnetic head module in used to replace the magnetic head in a POS terminal to provide transparent operation for legacy systems.

Example 2

In another preferred embodiment of the secure magnetic stripe reader module is placed in a cell phone or PDA attachment as an enhanced magnetic stripe reader with power management as described in pending patent application Ser. No. 10/074,086 titled Magnetic Stripe Reader for PDA and Method of Making Same. In this embodiment the functionality of the previous work is enhanced with TDES data encryption for security.

Example 3

In another preferred embodiment of the secure magnetic stripe reader attachment for a handheld computing device such as a PDA or cell phone the secure magnetic stripe reader is mounted in conjunction with a secure pin entry keypad in the attachment device allow for secure PIN entry required to accept debit card transactions. Even with access to the internal components and wiring of the attachment the PIN number and card information are held securely inside each secure module with only encrypted data available via the internal wiring. Tampering with the secure reader or secure pin pad module makes the units inoperable.

Example 4

In one preferred embodiment of the secure gateway server receives transaction requests from multiple devices employing the secure MSR module. The transaction data consists of the MSR serial number followed by three blocks of TDES encrypted data containing the swiped card's track 2 data along with a time or transaction number stamp. A second optional TDES data block contains control information to enhance the server's optional application operations such as card authenticity verification, issuing merchant and command requests such as a change key request. Three optional clear text characters are used to signal start of serial number, start of optional encrypted data block, and end of transaction blocks. The various clear text characters also indicate various encryption options such as selection between multiple encryption keys and formats.

Optionally for WAP based operations where transmission speed is a primary consideration, the transaction data format is adjusted to be a multiple of three characters in length. All transaction data including the serial number, encrypted data blocks, and clear text fields are sent as binary data. In this way a forty digit track two data block can be compressed from 40 to 20 bytes in length. The 8 digit serial number is compressed to 3 bytes in length. This converted binary data is converted to a format compatible with efficient keyboard emulation for the selected WAP device. In the case of Motorola WAP enabled cell phones with external keyboard support the each 3 bytes of binary data is converted to 4 mostly lower case ASCII characters. Using this technique the transaction data is sent in 38 characters rather then the 68 characters required if the data was not compressed.

This secure gateway has access to a secure database containing keys for all readers allowed access to the gateway. The reader serial number which is sent as part of the transaction in clear text is used to access the key for the readers track data block. The selected key is then used to decrypt the track data which is then packaged and forwarded a conventional wireless gateway for processing. In this way a secure transaction can be maintained over unsecured data paths while maintaining complete compatibility with the current transaction processing services.

Example 5

In another preferred embodiment of the secure gateway server the transaction data consists of the MSR serial number followed by three blocks of TDES encrypted data containing the swiped card's track 2 data along with a time or transaction number stamp. A second TDES data block contains the secure stripe TM signature of the swiped card along with control information to enhance the server's optional application operations such as card authenticity verification, issuing merchant and command requests such as a change key request. Three optional clear text characters are used to signal start of serial number, start of optional encrypted data block, and end of transaction blocks. The various clear text characters also indicate various encryption options such as selection between multiple encryption keys and formats. This secure gateway has access to a secure database containing keys for all readers allowed access to the gateway along with information to complete the transaction such as the internet URL or the phone number of the transaction processing server to be used by this reader.

In addition the gateway has access to a database containing valid secure stripe TM signatures and authentication decryption keys. The reader serial number which is sent as part of the transaction in clear text is used to access the key for the readers track signature block along with information to complete the transaction such as the internet URL or the phone number of the transaction processing server to be used by this reader. The selected keys are used to decode signature data along with a hash code generated by the secure module from the card data account number. The hash value generated from the card data is used to index the secure stripe database to retrieve the card signature. The database signature is then compared to the decrypted transaction signature and based on the comparison the transaction is sent to the processing bank indicated in the signature database or a message is sent back to the card holder requesting verification of the card's authenticity which may be in the form of a re-swipe of the card or entry of additional information such as billing zip code at which point the transaction is sent to the processing bank using standard formats or declined.

Example 6

In yet another preferred embodiment of the secure gateway server the transaction data consists of the MSR serial number followed by blocks of encrypted data containing the swiped card's track information along with a time or transaction number stamp and GPS location if available. A second TDES data block contains the secure stripe TM signature of the swiped card along with control information to enhance the server's optional application operations such as card authenticity verification, issuing merchant and command requests such as a change key request. Three optional clear text characters are used to signal start of serial number, start of optional encrypted data block, and end of transaction blocks.

The various clear text characters also indicate various encryption options such as selection between multiple encryption keys and formats. This secure gateway has access to two databases one containing the secure MSR module control block key and a second containing valid secure stripe TM signatures. The reader serial number which is sent as part of the transaction in clear text is used to access the key for the readers track control and signature block. The signature consists of two parts one is the signature value generated during the card swipe and a second is a hash code of that track two card data also generated during the swipe. The hash value is used to index the secure stripe database to retrieve the card signature. In this way, no card data is available on the secure server. The database signature is then compared to the decrypted transaction signature generating a card reliability index which is sent to the processing bank as additional information.

The bank also receives the encrypted card data may include the time of the transaction, the location of the transaction, and the secure modules unique transaction number. With this additional information the bank can made a more accurate ascertainment of the transactions authenticity prior to acceptance or denial of the requested transaction.

It should be noted that even though these examples and the supplied figures illustrate the use of the internet as the communication method of choice and communication method such as leased phone lines, POTS, microwave point to point link may be used in place of the internet method. It should be further noted that Legacy systems such as employed by Veri Fone and Hypercom using POTS and leased lines also benefit form the described art for both Legacy and new system implementations.

It should be understood, however, that even though these numerous characteristics and advantages of the invention have been set forth in the foregoing description, together with details of the structure and function of the invention, the disclosure is illustrative only, and changes may be made in detail, especially in matters of shape, size, construction, materials, chemistry and arrangement of parts within the principal of the invention to the full extent indicated by the broad general meaning of the terms in which the appended claims are expressed.

The invention claimed is:

1. A card stripe reader, comprising:
a housing;
a detector with a portion thereof encapsulated within the housing, the detector configured to detect magnetic card data and generate a first signal representing the card data; and
an encryption engine disposed outside the housing and in communicative contact with the detector, the encryption engine configured to encrypt a portion of the card data of the first signal and to generate a second signal that includes the encrypted card data, wherein the first and second signals have a same data format and the second signal includes a serial number along with the card data.

2. The card stripe reader of claim 1, wherein the data format of the second signal further comprises card data in a same data layout as card data on a data track of the magnetic card.

3. The card stripe reader of claim 1, wherein the portion of the card data is all or less than all the card data of a track of the magnetic card.

4. The card stripe reader of claim 1, wherein the data format of the second signal is in a same format as an output signal of conventional POS card stripe read data.

5. The card stripe reader of claim 1, wherein the format of the second signal is in a format readable by a processor in a non-encrypting card swipe terminal.

6. A card stripe reader, comprising:
a housing;
a detector with a portion thereof encapsulated within the housing, the detector configured to detect magnetic card data and generate a first signal representing the card data; and
an encryption engine disposed outside the housing and in communicative contact with the detector, the encryption engine configured to encrypt a portion of the card data of the first signal and to generate a second signal that includes the encrypted card data, wherein the first and second signals have a same data format and the second signal is formatted to include clear and encrypted data in card track format.

7. The method of claim 6, wherein the portion of the card data is all or less than all the card data of a track of the magnetic card.

8. The method of claim 6, wherein the second signal further includes a serial number along with the card data.

9. A terminal for reading a token used to in financial transactions, comprising:
a detector with at least a portion thereof encapsulated within a housing within the terminal, the detector configured to read token data from the token and to generate a signal representing the token data;

an encryption engine communicatively coupled to the detector and disposed outside the housing, the encryption engine configured to encrypt a portion of the token data in the signal and to generate a second signal including the encrypted token data, wherein the second signal has a same format as the signal generated by the detector; and a communication module communicatively coupled to the encryption engine and disposed within the housing, the communication module configured to transmit the second signal to a transaction processing network for the financial transaction.

10. A terminal for reading a token used to in financial transactions, comprising:

a detector with at least a portion thereof encapsulated within a housing within the terminal, the detector configured to read token data from the token and to generate a signal representing the token data; and an encryption engine communicatively coupled to the detector and disposed outside the housing, the encryption engine configured to encrypt a portion of the token data in the signal and to generate a second signal including the encrypted token data, wherein the second signal has a same format as the signal generated by the detector and the second signal comprises a serial number included with the encrypted token data.

11. A method for encrypting data for transmission on an unsecured public network, comprising the steps of:

a) acquiring magnetic stripe card track data using an magnetic stripe card reader;
b) selecting a portion of the acquired card track data;
c) encrypting the selected portion;
d) assembling an encrypted data package by replacing the selected portion of the acquired card track data with the encrypted data; and
e) outputting the encrypted data package into an unsecured POS device for the purpose of completing a financial transaction;

whereby the system maintains message format compatibility with the original magnetic stripe card data infrastructure system.

12. The method of claim 11, further comprising: adding unique identifier to the encrypted data.

13. The method of claim 11, wherein the magnetic stripe data consists of financial transaction data as specified in ISO/IEC 7813:2001(E): whereby the system maintains message format compatibility with legacy credit card payment infrastructure system, and does not adversely effect legacy POS equipment used to process transactions.

14. The method of claim 11, wherein the acquired card track data includes a serial number along with the card data.

15. The method of claim 11, wherein the acquired card track data is formatted to include clear and encrypted data in card track format.

* * * * *